US012804396B2

(12) United States Patent
Li et al.

(10) Patent No.: US 12,804,396 B2
(45) Date of Patent: Nov. 17, 2026

(54) CERTIFICATE-BASED NETWORK FUNCTION TYPE VERIFICATION FOR SERVICE AUTHORIZATION

(71) Applicant: HUAWEI TECHNOLOGIES CO., LTD., Shenzhen (CN)

(72) Inventors: Fei Li, Shenzhen (CN); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 613 days.

(21) Appl. No.: 18/309,530

(22) Filed: Apr. 28, 2023

(65) Prior Publication Data

US 2023/0262459 A1 Aug. 17, 2023

Related U.S. Application Data

(63) Continuation of application No. PCT/CN2021/125200, filed on Oct. 21, 2021.

(30) Foreign Application Priority Data

Oct. 30, 2020 (CN) ......................... 202011197519.5

(51) Int. Cl.
*H04W 12/069* (2021.01)
*H04W 12/69* (2021.01)

(52) U.S. Cl.
CPC ......... *H04W 12/069* (2021.01); *H04W 12/69* (2021.01)

(58) Field of Classification Search
CPC ............................ H04W 12/069; H04W 12/69
USPC ........................................................ 455/410
See application file for complete search history.

(56) References Cited

U.S. PATENT DOCUMENTS

2016/0094542 A1* 3/2016 Lee ..................... H04W 12/062 726/7
2018/0084413 A1* 3/2018 Lee ....................... H04W 76/25
2019/0251241 A1 8/2019 Bykampadi et al.
2020/0119909 A1* 4/2020 Zhang ................... H04L 9/3247
2023/0262463 A1* 8/2023 Kunz .................. H04L 63/1475 455/410

(Continued)

FOREIGN PATENT DOCUMENTS

WO WO-2021/140272 A1 * 7/2021 ........ H04W 12/0431

OTHER PUBLICATIONS

EP4224346—EP Extended Supplemental Search Report (Year: 2024).*

(Continued)

*Primary Examiner* — Allahyar Kasraian
(74) *Attorney, Agent, or Firm* — Leydig, Voit & Mayer, Ltd.

(57) ABSTRACT

A service authorization method includes: A first network element sends a first token request to a network repository function network element. After receiving the first token request from the first network element, the network repository function network element may complete verification on validity of a network function service consumer entity by determining, through verification, whether first information of the network function service consumer entity that is carried in the first token request matches second information in a certificate in an assertion of the network function service consumer entity, and does not rely on a profile of the network function service consumer entity to verify the validity of the network function service consumer entity.

20 Claims, 11 Drawing Sheets

(56) References Cited

U.S. PATENT DOCUMENTS

2025/0062903 A1* 2/2025 Khare .................. H04L 9/3247

OTHER PUBLICATIONS

EP4224346—EP Written Opinion and Search—Cover Page (Year: 2024).*

EP4224346—EP Written Opinion (Year: 2024).*

“3rd Generation Partnership Project; Technical Specification Group Services and System Aspects; Security architecture and procedures for 5G system (Release 16),” 3GPP TS 33.501 V16.4.0, Total 250 pages (Sep. 2020) ..

“Client authentications in token-based authorization for indirect communication,” CableLabs et al., 3GPP TSG-SA3 Meeting #99e, S3-201081, Total 6 pages (May 11-15, 2020).

“End to end authentication of NF in SBA,” CableLabs et al., 3GPP TSG SA WG3 Meeting #99e, S3-201082, Total 5 pages (May 11-15, 2020).

Nokia et al., “NF consumer authentication by the producer in direct communication scenarios,” 3GPP TSG-SA WG3 Meeting #98e, e-Meeting, S3-200412, Total 5 pages, 3rd Generation Partnership Project, Valbonne, France (Mar. 2-6, 2020).

Nokia et al., “Making NF instance id in SBA certificate profile mandatory to support,” 3GPP TSG-SA Meeting #89-e, Online, SP-200857, Total 5 pages, 3rd Generation Partnership Project, Valbonne, France (Sep. 15-21, 2020).

“3rd Generation Partnership Project; Technical Specification Group Services and System Aspects; Security architecture and procedures for 5G system (Release 16),” 3GPP TS 33.501 v16.4.0, total 250 pages, 3rd Generation Partnership Project, Valbonne, France (Sep. 2020).

* cited by examiner

CERTIFICATE-BASED NETWORK FUNCTION TYPE VERIFICATION FOR SERVICE AUTHORIZATION

CROSS-REFERENCE TO RELATED APPLICATIONS

This application is a continuation of International Application No. PCT/CN2021/125200, filed on Oct. 21, 2021, which claims priority to Chinese Patent Application No. 202011197519.5, filed on Oct. 30, 2020. The disclosures of the aforementioned applications are hereby incorporated by reference in their entireties.

TECHNICAL FIELD

This application relates to the field of communications technologies, and in particular, to a service authorization method, a communication apparatus, and a system.

BACKGROUND

The 3rd generation partnership project (3GPP) proposes to use a service-based architecture (SBA) and enhancement of a service-based architecture (eSBA) in a 5th generation (5G) mobile communication system.

In the SBA or the eSBA, all network functions (NFs) support the transport layer security (TLS) protocol. A network function service provider (NFp) entity allows an authorized network function service consumer (NFc) entity to access a service of the network function service provider entity. A network repository function (NRF) network element provides services such as management, discovery, and authorization for the NF.

An authorization process includes: The NFc entity requests authorization from the NRF network element, to request to obtain a token corresponding to a service that the NFc entity wants to request; the NRF network element generates the token based on a certificate of the NFc entity, and sends the token to the NFc entity; and after obtaining the token, the NFc may request, based on the token, the service from the NFp entity that has the service.

In the foregoing authorization process, when receiving the token request from the NFc entity, the NRF network element generally verifies, based on a locally stored profile of the NFc entity, a parameter (for example, single network slice selection assistance information (S-NSSAI)) carried in the token request, to prevent the NFc entity from maliciously reporting a parameter of the NFc entity to obtain NRF authorization. However, the NRF does not store profiles of a part of NFcs. As a result, the NRF cannot verify parameters of the NFcs.

SUMMARY

Embodiments of this application provide a service authorization method, a communication apparatus, and a system, to resolve a problem that an NRF cannot verify a part of NFcs, so that network reliability and security are effectively improved.

According to a first aspect, an embodiment of this application provides a service authorization method. The method includes: A first network element sends a first token request to a network repository function network element, where the first token request includes first information of a network function service consumer entity and an assertion of the network function service consumer entity, the assertion includes a certificate of the network function service consumer entity, and the certificate includes second information of the network function service consumer entity. After receiving the first token request, the network repository function network element determines, through verification, whether the first information matches the second information; after determining that the first information matches the second information, generates a token; and sends the token to the first network element. The first network element receives the token.

In the foregoing technical solution, after receiving the first token request from the first network element, the network repository function network element may complete verification on validity of the network function service consumer entity by determining, through verification, whether the first information of the network function service consumer entity that is carried in the first token request matches the second information in the certificate in the assertion of the network function service consumer entity, and does not rely on a profile of the network function service consumer entity to verify the validity of the network function service consumer entity. Therefore, for a network function service consumer entity whose profile is not stored in the network repository function network element, the network repository function network element may also verify validity of a parameter of the network function service consumer entity, so that security of using a network function service is effectively improved.

In an embodiment, the first information includes one or more of the following: a first public land mobile network identifier, a first standalone non-public network identifier, a first single network slice selection assistance information identifier, a first network function instance identifier, a first network function type, a first network function set, and a first uniform resource identifier. The second information includes one or more of the following: a second public land mobile network identifier, a second standalone non-public network identifier, a second single network slice selection assistance information identifier, a second network function instance identifier, a second network function type, a second network function set, and a second uniform resource identifier.

In the foregoing technical solution, the first information and the second information may include parameter information of one or more network function service consumer entities, so that flexibility and reliability of the technical solution are effectively improved.

It should be noted that information included in the first information is in a one-to-one correspondence with information included in the second information.

For example, when the first information includes the first network function instance identifier, the second information includes the second network function instance identifier. For another example, when the first information includes the first standalone non-public network identifier and the first public land mobile network identifier, the second information includes the second standalone non-public network identifier and the second public land mobile network identifier. For still another example, when the first information includes the first public land mobile network identifier, the first standalone non-public network identifier, and the first network function instance identifier, the second information includes the second public land mobile network identifier, the second standalone non-public network identifier, and the second network function instance identifier.

It should be understood that there are a plurality of specific implementations in which the network repository function network element determines, through verification, whether the first information matches the second information, including but not limited to the following two implementations:

Implementation 1: If determining that the first information is the same as the second information, the network repository function network element determines that the first information matches the second information.

For example, when the first information is the first public land mobile network identifier, and the second information is the second public land mobile network identifier, if the first public land mobile network identifier is the same as the second public land mobile network identifier, where for example, both are 1, the network repository function network element determines that the first information matches the second information.

Implementation 2: If determining that the first information is a subset of the second information, the network repository function network element determines that the first information matches the second information.

For example, when the first information is the first standalone non-public network identifier, the second information is the standalone non-public network identifier, the first standalone non-public network identifier is 1, and the second standalone non-public network identifier is $\{1, 2, 4\}$, the first standalone non-public network identifier is a subset of the second standalone non-public network identifier, and the network repository function network element determines that the first information matches the second information.

In the foregoing technical solution, the network repository function network element may verify a matching relationship between the first information and the second information in a plurality of manners, so that flexibility of the technical solution provided in this embodiment of this application is further improved.

In an embodiment, after receiving the token, the first network element may further send a first service request to a network function service provider entity, where the first service request is for requesting the network function service provider entity to provide a service for the network function service consumer entity, the first service request includes the token and the assertion, the token includes a first network function instance identifier, and the assertion further includes a second network function instance identifier. After receiving the first service request, the network function service provider entity may determine, through verification, whether the first network function instance identifier is the same as the second network function instance identifier, and after determining that the first network function instance identifier is the same as the second network function instance identifier, provide the service for the network function service consumer entity.

In the foregoing technical solution, the network function service provider entity verifies the network function instance identifier in the token and the network function instance identifier carried in the assertion that are carried in the service request. This ensures matching between the token and the assertion that are in the service request, and avoids a case in which an attacker illegally steals the token, and further illegally obtains a network function service. Therefore, security of using the network function service is effectively improved.

It should be noted that the first network element may be a service communication proxy network element, or may be a network function service consumer entity. This is not specifically limited in this embodiment of this application.

In an embodiment, the first network element is a service communication proxy network element, and before that the service communication proxy network element sends a first token request to a network repository function network element, the service communication proxy network element may further receive a second token request or a second service request from the network function service consumer entity, where the second token request or the second service request includes the certificate. Then, the service communication proxy network element obtains a first fully qualified domain name FQDN and a third network function instance identifier that are associated with the certificate, and determines that the first FQDN matches the third network function instance identifier.

In an embodiment, the first network element is a service communication proxy network element, and after receiving the token, the first network element may further send the token to the network function service consumer entity, and receive the first service request from the network function service consumer entity, where the first service request includes the certificate. Then, the service communication proxy network element obtains a first FQDN and a third network function instance identifier that are associated with the certificate, and after determining that the first FQDN matches the third network function instance identifier, sends the first service request to the network function service provider entity.

There are a plurality of implementations in which the service communication proxy network element determines that the first FQDN matches the third network function instance identifier, including but not limited to the following two implementations:

Implementation 1: The service communication proxy network element obtains a binding relationship between the FQDN and the network function instance identifier from the network repository function network element, and determines, based on the binding relationship, whether the first FQDN matches the third network function instance identifier.

Implementation 2: The service communication proxy network element sends the first fully qualified domain name FQDN and the third network function instance identifier to the network repository function network element, and the network repository function network element determines, based on a binding relationship locally stored by the network repository function network element or a binding relationship obtained from a certificate management authority entity, whether the first FQDN matches the third network function instance identifier.

In the foregoing technical solution, before sending the service request to the network function service provider entity, the service communication proxy network element first verifies a matching relationship between the FQDN and the third network function instance identifier that are associated with the certificate in the assertion of the network function service consumer entity, and only after the verification succeeds, sends the service request to the network function service provider entity. Therefore, a case in which an attacker illegally steals the assertion, and further illegally obtains a network function service can be avoided, so that security of using the network function service is effectively improved.

In an embodiment, the first network element is a network function service consumer entity, and a specific implementation in which the first network element sends a first service request to a network function service provider entity may be as follows: The network function service consumer entity sends the first service request to the network function service provider entity by using a service communication proxy network element, where the first service request includes the certificate. The service communication proxy network element receives the first service request from the first network element, after receiving the first service request, may further obtain a first fully qualified domain name FQDN and a third network function instance identifier that are associated with the certificate, and after determining that the first FQDN matches the third network function instance identifier, send the first service request to the network function service provider entity.

In the foregoing technical solution, before sending the service request to the network function service provider entity, the service communication proxy network element first verifies a matching relationship between the first FQDN and the third network function instance identifier that are associated with the certificate in the assertion of the network function service consumer entity, and only after the verification succeeds, sends the service request to the network function service provider entity. Therefore, a case in which an attacker illegally steals the assertion, and further illegally obtains a network function service can be avoided, so that security of using the network function service is effectively improved.

In an embodiment, after receiving the first token request, and before sending the token to the first network element, the network repository function network element may obtain the first fully qualified domain name FQDN and the third network function instance identifier that are associated with the certificate, and determine that the first FQDN matches the third network function instance identifier and that the first information matches the second information.

In the foregoing technical solution, before returning the token to the first network element, the network repository function network element first verifies a matching relationship between the first FQDN and the third network function instance identifier that are associated with the certificate in the assertion of the network function service consumer entity, and the first information and the second information in the token request, and only after the verification succeeds, returns the token. The service communication proxy network element can initiate the service request only after receiving the token. Therefore, a case in which an attacker illegally steals the assertion, and further illegally obtains a network function service can be avoided, so that security of using the network function service is effectively improved.

In an embodiment, before sending a first token request to the network repository function network element, the network function service consumer entity may further send a certificate application request to the certificate management authority entity, where the certificate application request includes a certificate template, and the certificate template includes the first FQDN and the second information. After receiving the certificate application request, the certificate management authority entity may generate a certificate based on the first FQDN and the second information, and send the certificate to the network function service consumer entity, where the certificate includes the first FQDN.

In the foregoing technical solution, the network function service consumer entity includes the first FQDN and the second information in the certificate application request, so that the certificate includes richer information. This effectively enhances reliability of certificate information verification.

In an embodiment, the certificate management authority entity may further generate a binding relationship between the first FQDN and the third network function instance identifier based on the first FQDN and the third network function instance identifier in the second information that are in the certificate template, and store the binding relationship.

In the foregoing technical solution, the certificate management authority entity generates the binding relationship between the first FQDN and the third network function instance identifier. This further improves reliability of certificate verification, and effectively avoids a case in which an attacker illegally steals a statement, and further illegally obtains a service.

In an embodiment, after receiving the first service request from the network function service consumer entity, or receiving a service registration request from the network function service provider entity, the network repository function network element may further obtain the binding relationship from the certificate management authority entity.

In the foregoing technical solution, only after receiving the first service request from the network function service consumer entity, or receiving the service registration request from the network function service provider entity, the network repository function network element obtains the binding relationship from the certificate management authority entity, and does not need to locally store the binding relationship, so that storage resources of the network repository function network element are effectively reduced.

According to a second aspect, a service authorization method is provided. The method may be applied to a network repository function network element, or may be applied to a chip inside a network repository function network element. For example, the method may be applied to the network repository function network element, and the method includes: receiving a first token request from a first network element, where the first token request includes first information of a network function service consumer entity and an assertion of the network function service consumer entity, the assertion includes a certificate of the network function service consumer entity, and the certificate includes second information of the network function service consumer entity; and determining, through verification, whether the first information matches the second information, after determining that the first information matches the second information, generating a token, and sending the token to the first network element.

In an embodiment, after receiving a first token request, and before sending the token to the first network element, the network repository function network element may further obtain a first FQDN and a third network function instance identifier that are associated with the certificate, and determine that the first FQDN matches the third network function instance identifier and that the first information matches the second information.

In an embodiment, there are a plurality of implementations in which the network repository function network element determines, through verification, whether the first information matches the second information, including but not limited to the following two implementations:

Implementation 1: If the first information is the same as the second information, it is determined that the first information matches the second information.

Implementation 2: If it is determined that the first information is a subset of the second information, it is determined that the first information matches the second information.

In an embodiment, after receiving a first service request from the network function service consumer entity, or receiving a service registration request from the network function service provider entity, the network repository function network element may obtain a binding relationship between the FQDN and the network function instance identifier from a certificate management authority.

According to a third aspect, a service authorization method is provided. The method may be applied to a first network element, or may be applied to a chip inside the first network element. For example, the method may be applied to the first network element, and the method includes:

sending a first token request to a network repository function network element, where the first token request includes first information of a network function service consumer entity and an assertion of the network function service consumer entity, the assertion includes a certificate of the network function service consumer entity, and the certificate includes second information of the network function service consumer entity; and receiving a token from the network repository function network element.

In an embodiment, after receiving the token, the first network element may further send a first service request to the network function service provider entity, where the first service request includes the token and the assertion, the token includes a first network function instance identifier, the assertion further includes a second network function instance identifier, and the first service request is for requesting the network function service provider entity to provide a service for the network function service consumer entity.

In an embodiment, the first network element is a service communication proxy network element, and before the sending a first token request to a network repository function network element, the method further includes: receiving a second token request or a second service request from the network function service consumer entity, where the second token request or the second service request includes the certificate; obtaining a first fully qualified domain name FQDN and a third network function instance identifier that are associated with the certificate; and determining that the first FQDN matches the third network function instance identifier.

In an embodiment, the first network element is a network function service consumer entity, and after receiving the token, the network function service consumer entity may further send the first service request to the network function service provider entity by using the service communication proxy network element, where the first service request indicates the network function service provider entity to provide a service for the network function service consumer entity.

In an embodiment, when the first network element is a network function service consumer entity, before sending a first token request to a network storage function network element, the network function service consumer entity may further send a certificate application request to a certificate management authority, where the certificate application request includes a certificate template, and the certificate template includes the first FQDN and the second information.

According to a fourth aspect, a service authorization method is provided. The method may be applied to a network function service provider entity, or may be applied to a chip inside the network function service provider entity. For example, the method may be applied to the network function service provider entity, and the method includes: receiving a first service request from a first network element, where the first service request includes a token and an assertion, the token includes a first network function instance identifier, and the assertion includes a second network function instance identifier; determining, through verification, whether the first network function instance identifier matches the second network function instance identifier; and after determining that the first network function instance identifier matches the second network function instance identifier, providing a service for a network function service consumer entity.

According to a fifth aspect, a communication apparatus is provided. The apparatus includes a module configured to perform the method according to any one of the second aspect or the possible implementations of the second aspect.

In an example, the apparatus may include:

a transceiver unit, configured to receive a first token request from a first network element, where the first token request includes first information of a network function service consumer entity and an assertion of the network function service consumer entity, the assertion includes a certificate of the network function service consumer entity, and the certificate includes second information of the network function service consumer entity; and a processing unit, configured to determine, through verification, whether the first information matches the second information, and after determining that the first information matches the second information, generate a token, where the transceiver unit is further configured to send the token to the first network element.

In an embodiment, after the transceiver unit receives the first token request and before the transceiver unit sends the token to the first network element, the processing unit is further configured to: obtain a first FQDN and a third network function instance identifier that are associated with the certificate; and determine that the first FQDN matches the third network function instance identifier and that the first information matches the second information.

In an embodiment, when being configured to determine, through verification, whether the first information matches the second information, the processing unit is specifically configured to: if the first information is the same as the second information, determine that the first information matches the second information; or if determining that the first information is a subset of the second information, determine that the first information matches the second information.

According to a sixth aspect, a communication apparatus is provided. The apparatus includes a module configured to perform the method according to any one of the third aspect or the possible implementations of the third aspect.

In an example, the apparatus may include:

a processing unit, configured to generate a first token request, where the first token request includes first information of a network function service consumer entity and an assertion of the network function service consumer entity, the assertion includes a certificate of the network function service consumer entity, and the certificate includes second information of the network function service consumer entity; and a transceiver unit, configured to send the first token request to a network repository function network element, and receive a token from the network repository function network element.

In an embodiment, after receiving the token, the transceiver unit is further configured to:

send a first service request to a network function service provider entity, where the first service request includes the token and the assertion, the token includes a first network function instance identifier, and the assertion further includes a second network function instance identifier, where the first service request is for requesting the network function service provider entity to provide a service for the network function service consumer entity.

In an embodiment, the first network element is a service communication proxy network element, and before sending the first token request to the network repository function network element, the transceiver unit is further configured to: receive a second token request or a second service request from the network function service consumer entity, where the second token request or the second service request includes the certificate. The processing unit is further configured to: obtain a first fully qualified domain name FQDN and a third network function instance identifier that are associated with the certificate, and determine that the first FQDN matches the third network function instance identifier.

According to a seventh aspect, a communication apparatus is provided. The apparatus includes a module configured to perform the method according to any one of the fourth aspect or the possible implementations of the fourth aspect.

In an example, the apparatus may include:

a transceiver unit, configured to receive a first service request from a first network element, where the first service request includes a token and an assertion, the token includes a first network function instance identifier, and the assertion includes a second network function instance identifier; and a processing unit, configured to determine, through verification, whether the first network function instance identifier matches the second network function instance identifier, and after determining that the first network function instance identifier matches the second network function instance identifier, provide a service for a network function service consumer entity.

According to an eighth aspect, a serving authorization system is provided. The system includes the communication apparatus according to any one of the fifth aspect or the possible implementations of the fifth aspect and the communication apparatus according to any one of the sixth aspect or the possible implementations of the sixth aspect.

Optionally, the system further includes the communication apparatus according to the seventh aspect.

According to a ninth aspect, an electronic device is provided, including: at least one processor, and a memory and a communication interface that are communicatively connected to the at least one processor. The memory stores instructions that can be executed by the at least one processor, and the at least one processor executes the instructions stored in the memory, so that the electronic device performs a method according to embodiments of the second aspect, a method according to embodiments of the third aspect, or a method according to embodiments of the fourth aspect.

According to a tenth aspect, a computer-readable storage medium is provided, including a program or instructions. When the program or the instructions are run on a computer, a method according to embodiments of the second aspect, a method according to embodiments of the third aspect, or a method according to embodiments of the fourth aspect is performed.

According to an eleventh aspect, a chip is provided. The chip is coupled to a memory, and is configured to read and execute program instructions stored in the memory, so that a method according to embodiments of the second aspect, a method according to embodiments of the third aspect, or a method according to embodiments of the fourth aspect is performed.

According to a twelfth aspect, computer program instructions are provided. When the computer program instructions are run on a computer, a method according to embodiments of the second aspect, a method according to embodiments of the third aspect, or a method according to embodiments of the fourth aspect is performed.

For technical effects that can be achieved by embodiments of the second aspect to the twelfth aspect, refer to technical effects that can be achieved by a method according to embodiments of the first aspect. Details are not described herein again.

DESCRIPTION OF EMBODIMENTS

Figure 1:
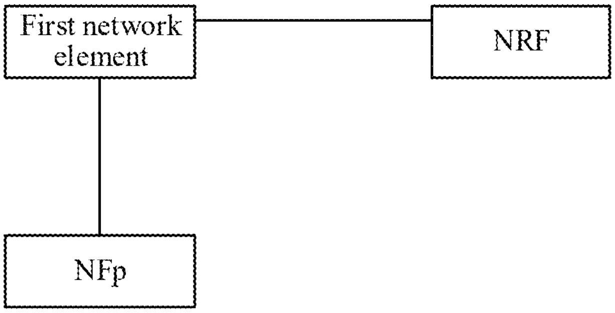
FIG. 1 is a schematic diagram of a structure of a communication system to which an embodiment of this application is applicable.

First, some terms in embodiments of this application are explained for ease of understanding.

(1) A certificate is a digital certificate, and is a file digitally signed by a certificate authority (CA) and including public key owner information and a public key. The certificate is for identity authentication between communication parties. The certificate generally includes information such as a certificate version number (version), a serial number, a signature algorithm identifier (signature), an issuer name (issuer), subject public key information (subject public key info), and validity, and may also include an issuer identifier (issuer unique identifier), a subject identifier (subject unique identifier), and other extension information (extensions). Embodiments of this application relate to a certificate of an NF service consumer entity. The certificate may be an application layer certificate, may be a transport layer security (TLS) certificate, or may be a certificate shared by an application layer and a transport layer.

(2) A network function service consumer (NFc) entity, referred to as an "NFc entity" or an "NFc" for short, may be specifically an NF that can invoke a function service in a service-based architecture, for example, a session management function (SMF) network element, an access and mobility management function (AMF) network element, or an authentication server function (AUSF) network element.

(3) A network function service provider (NFp) entity, referred to as an "NFp entity" or an "NFp" for short, may be specifically an NF that has a function service that can be invoked in a service-based architecture, for example, an SMF network element, an AUSF network element, or a unified data management (UDM) network element.

(4) A network repository function (NRF) network element, referred to as an "NRF network element" or an "NRF" for short, is configured to be responsible for NF automated management, selection, and extension, specifically including NF service registration, discovery, status monitoring, service authorization, and the like, to implement on-demand configuration of a network function and a service and interconnection between NFs. For example, the NRF has functions such as token generation and token verification.

(5) A service communication proxy (SCP) network element, referred to as an "SCP network element" or an "SCP" for short, may be for indirect communication between NFs, may be further configured to implement load balancing and NF selection, and may further have functions such as NF registration, discovery, and service authorization.

In some possible embodiments, the term "network element" may be replaced with "entity", "device", or the like. For example, the "AMF network element" may also be written as an "AMF entity" or an "AMF device", and the "SMF network element" may also be written as an "SMF entity" or an "SMF device". For ease of description, an "XXX network element" is uniformly abbreviated as an "XXX" in the following. For example, the "AUSF network element" may also be abbreviated as an "AUSF", and the "SMF network element" may also be abbreviated as an "SMF".

It should be understood that each network element shown in the terms in this application may be a physical concept. For example, the network element may be a single device physically, or at least two network elements may be integrated into a same physical device. Alternatively, the network element shown in this specification may be a logical concept, for example, a software module or a network function corresponding to a service provided by each network element. The network function may be understood as a virtualization function in virtualization implementation, or may be understood as a network function providing a service in a service-based architecture.

In embodiments of this application, a term "at least one" indicates one or more, and "a plurality of" indicates two or more. The term "and/or" describes an association relationship for describing associated objects and represents that three relationships may exist. For example, A and/or B may represent the following three cases: Only A exists, both A and B exist, and only B exists. A and B each may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may represent a, b, c, a and b, a and c, b and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include" and "have" in embodiments, claims, and accompanying drawings of this application are not exclusive. For example, a process, a method, a system, a product, or a device including a series of steps or modules is not limited to the listed steps or modules, and may further include steps or modules that are not listed.

The technical solutions in embodiments of this application may be applied to various communication systems, for example, a 4th generation (4G) communication system, a 5th generation (5G) communication system, another future evolved system, or various other wireless communication systems that use a radio access technology. The technical solutions in embodiments of this application may be applied to any communication system that has a requirement such as service authentication or authorization. In addition, the network elements used in embodiments of this application may have different names in a future communication system.

For example, FIG. 1 shows a communication system to which embodiments of this application are applicable. The communication system includes a first network element, an NRF, and an NFp.

The first network element may be an NFc. The NFc may request service authorization of the NFp from the NRF, for example, request a token corresponding to the NFp, and initiate a service request to the NFp after obtaining the authorization from the NRF (for example, after obtaining the token).

The first network element may alternatively be an SCP that is communicatively connected to the NFc. The SCP may act as a proxy for a part of functions of the NFc, or act as a proxy for the NFc to execute the method. For example, the SCP may request, as a proxy for the NFc, service authorization of the NFp from the NRF, or initiate, as a proxy for the NFc, a service request to the NFp.

It should be understood that, during actual application, the communication system shown in FIG. 1 may further include more network elements.

Figure 2:
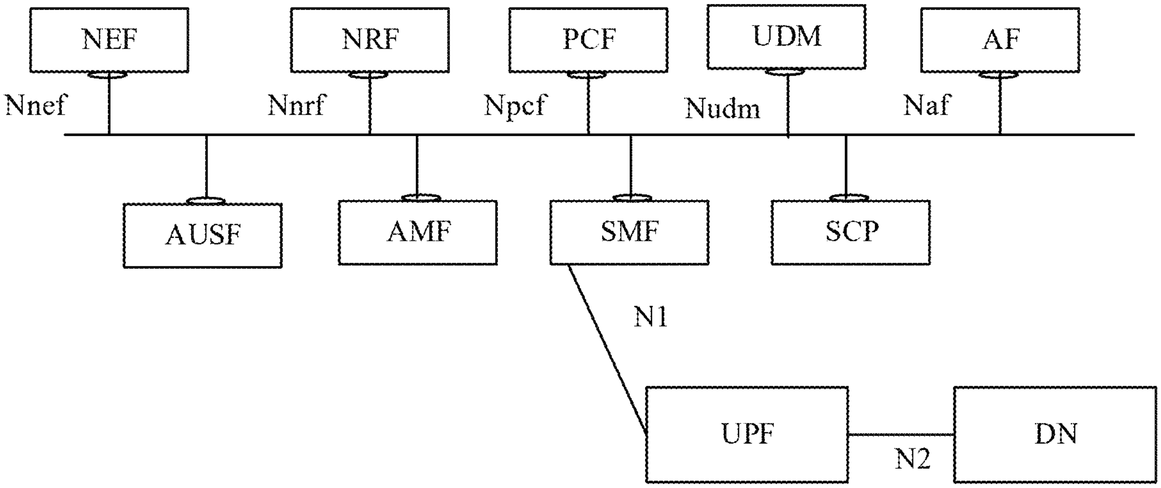
FIG. 2 is a schematic diagram of a structure of a specific communication system to which an embodiment of this application is applicable.

For example, FIG. 2 shows a specific communication system to which embodiments of this application are applicable. The communication system includes a core network (CN). As a bearer network, the CN provides an interface to a data network (DN), and provides a terminal device with communication connection, authentication, management, policy control, data service bearer, and the like. The CN may include the following network elements: an SMF network element, an AMF network element, a UDM network element, an AUSF network element, a policy control function (PCF) network element, a user plane function (UPF) network element, a network slice selection function (NS SF) network element, a network exposure function (NEF) network element, an NRF, an application function (AF) network element, and the like.

It should be noted that the CN may include one or more CN devices. The CN device may be a network element configured to perform the foregoing single network function, or may be a network element configured to perform the foregoing plurality of network functions. When one CN device is configured to perform the plurality of network functions, the CN device may include one or more functional modules configured to perform the plurality of network functions. The functional module may be a software module, or may be a software/hardware module. This is not limited in embodiments of this application.

It should be noted that the AMF, the SMF, the AUSF, the UDM, the NEF, the PCF, the AF, the NSSF, and the like may interact with each other by using a service-based interface. For example, as shown in FIG. 1, Namf, Nsmf, Nausf, Nudm, Nnef, Npcf, Naf, Nnssf, and Nnrf are respectively service-based interfaces presented by the AMF, the SMF, the AUSF, the UDM, the NEF, the PCF, the AF, the NSSF, and the NRF. N1 and N2 are respectively a service-based interface between the SMF and a UPF and a service-based interface between the UPF and a DN.

The first network element in FIG. 1 may be specifically the SCP, the SMF, the AMF, or the like in FIG. 2. The NRF in FIG. 1 may be specifically the NRF in FIG. 2. The NFp in FIG. 1 may be specifically the SMF, the UDM, or the like in FIG. 2.

It should be understood that FIG. 2 is merely a simplified schematic diagram of an example for ease of understanding. The communication system may further include more network elements or devices. For example, optionally, the communication system further includes a terminal device. Optionally, the communication system further includes a RAN.

A terminal device, also referred to as a terminal, may include a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may be user equipment (UE), a wireless terminal device, a mobile terminal device, a device-to-device (D2D) communication terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

The RAN is mainly responsible for access of UE. The RAN device is a device that is located on a network side of the communication system and that has a wireless transceiver function, or a chip that can be disposed in the device. The access network device includes but is not limited to: an evolved NodeB (evolved node B, eNB), a radio network controller (RNC), a NodeB (node B, NB), a base station controller (BSC), a base transceiver station (BTS), a home base station (for example, a home evolved nodeB, or a home nodeB, HNB), a baseband unit (base band unit, BBU), an access point (AP) in a wireless fidelity (Wi-Fi) system, a wireless relay node, a wireless backhaul node, a transmission reception point (transmission and reception point, TRP or transmission point, TP), or the like. Alternatively, the access network device may be a gNB or a transmission point (TRP or TP) in a 5G system such as a new radio (NR) system, or one antenna panel or a group of antenna panels (including a plurality of antenna panels) of a base station in a 5G system, or may be a network node, such as a baseband unit (BBU) or a distributed unit (DU), that constitutes a gNB or a transmission point.

Embodiments of this application may be applied to a scenario in which an NFc obtains a token from an NRF, to request a service from a corresponding NFp in a service-based architecture.

Figure 3A:
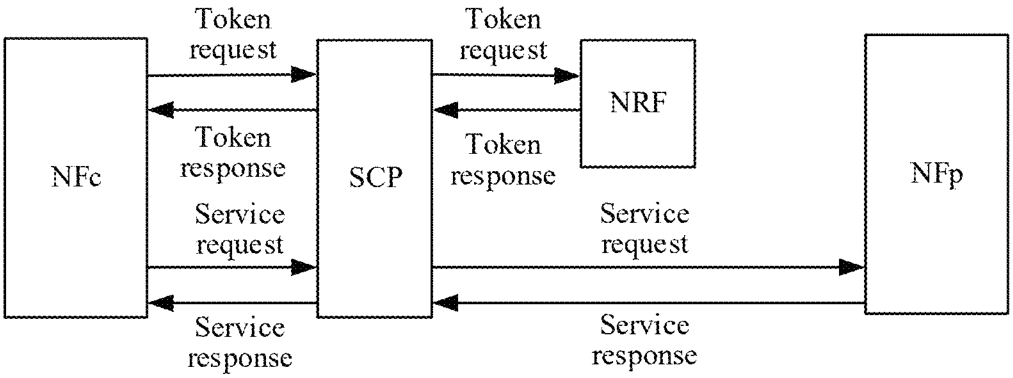
FIG. 3A is a schematic diagram of an application scenario to which an embodiment of this application is applicable.
Figure 3B:
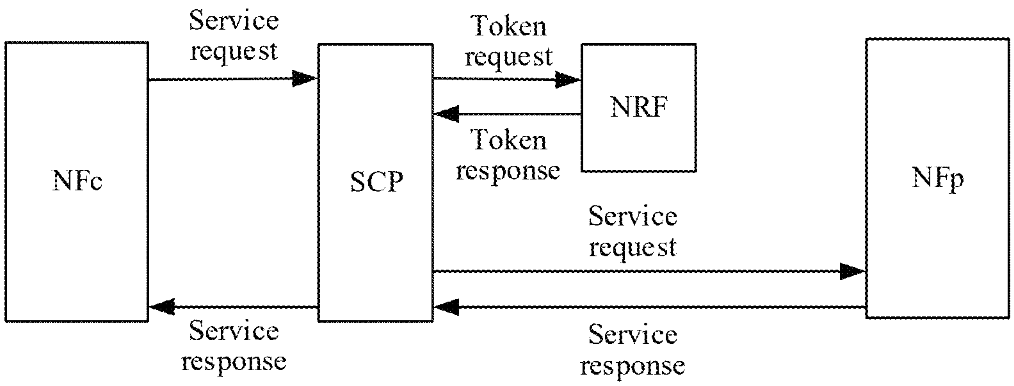
FIG. 3B is a schematic diagram of another application scenario to which an embodiment of this application is applicable.
Figure 3C:
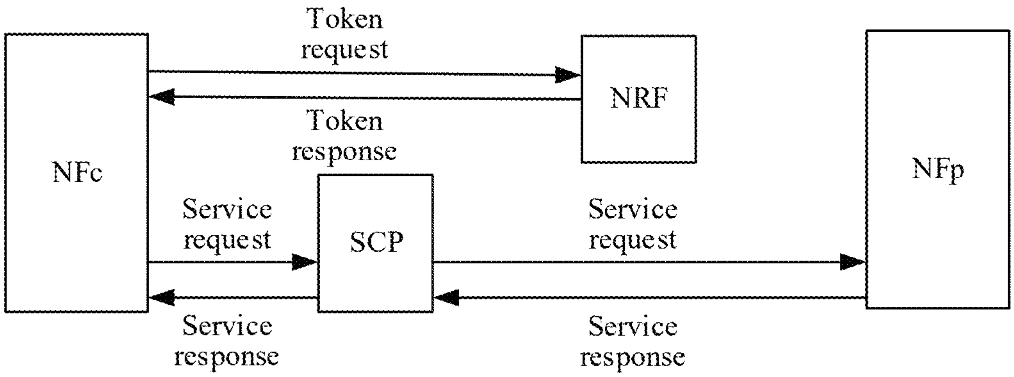
FIG. 3C is a schematic diagram of another application scenario to which an embodiment of this application is applicable.

FIG. 3A to FIG. 3C show several possible specific application scenarios according to embodiments of this application.

As shown in FIG. 3A, an SCP requests, from an NRF and as a proxy for an NFc, a token for requesting a service from an NFp. The NRF generates the corresponding token, and returns the token to the NFc through the SCP. The SCP sends, as a proxy for the NFc, a service request to the NFp. The NFp receives the service request, and returns a service response to the NFc through the SCP.

As shown in FIG. 3B, an NFc sends a service request to an SCP, so that the SCP initiates, as a proxy for the NFc, a token request to an NRF to obtain a token for requesting a service from an NFp. The NRF generates the corresponding token, and returns the token to the SCP. The SCP sends, as a proxy for the NFc, a service request to the NFp. The NFp receives the service request, and returns a service response to the NFc through the SCP.

As shown in FIG. 3C, an NFc directly requests, from an NRF, a token for requesting a service from an NFp. The NRF generates the corresponding token, and returns the token to the NFc. As a proxy for the NFc, an SCP sends a service request to the NFp. The NFp receives the service request, and returns a service response to the NFc through the SCP.

It should be understood that the foregoing several scenarios are merely examples rather than limitations.

With reference to the accompanying drawings, the following describes service authorization methods provided in embodiments of this application.

In an eSBA or an SBA, after receiving a token request from an NFc, an NRF generally verifies, based on a profile of the NFc shown in Table 1, a parameter carried in the token request, to prevent the NFc from maliciously reporting a parameter of the NFc to obtain authorization from the NRF. For example, single network slice selection assistance information (S-NSSAI) carried in the token request is verified, to verify validity of the NFc. However, the NRF does not store profiles of a part of NFcs (for example, an NFc that is not registered with the NRF). As a result, the NRF cannot verify parameters of the NFcs.

TABLE 1

| Profile |
| --- |
| Single network slice selection assistance information identifier |
| Fully qualified domain name |
| Standalone non-public network identifier |

For the foregoing technical problem, an embodiment of this application provides a service authorization method. The method may be applied to the communication system shown in FIG. 1.

Figure 4:
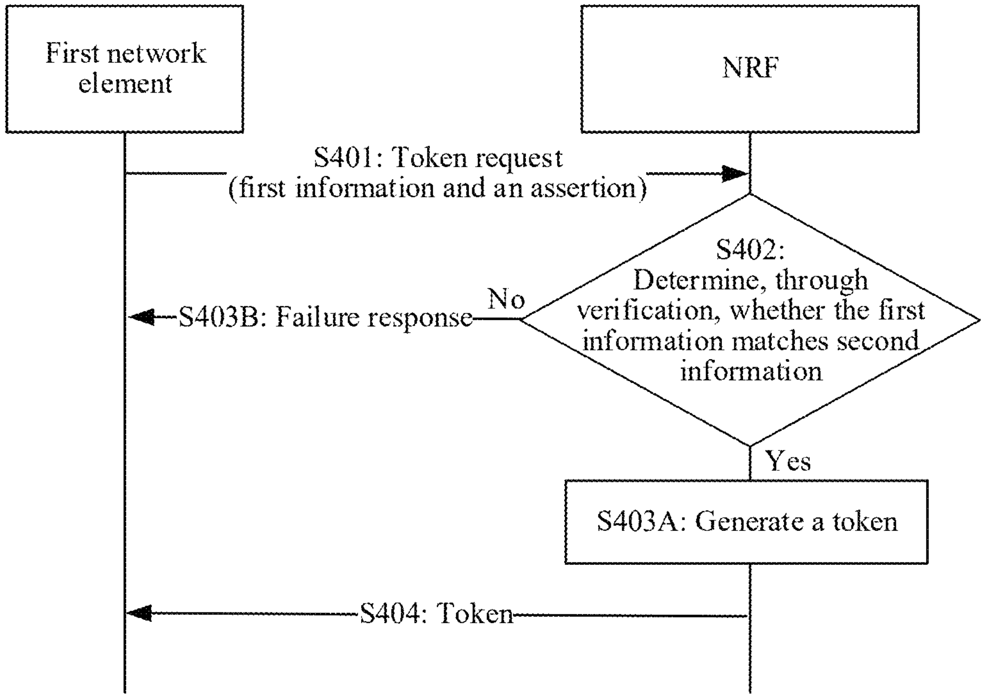
FIG. 4 is a schematic flowchart of a service authorization method according to an embodiment of this application.

Refer to FIG. 4. The method includes the following procedure.

S401: A first network element sends a first token request to an NRF, and the NRF receives the first token request from the first network element.

The first network element in this embodiment of this application may be an NFc, or may be an SCP. This is not specifically limited in this embodiment of this application.

The NFc in this embodiment of this application may be any network element that can invoke a function service, for example, the SMF or the AMF in FIG. 2. This is not limited herein.

The first token request includes first information of the NFc and an assertion (assertion) of the NFc. The assertion includes a certificate of the NFc, and the certificate includes second information of the NFc.

The first information may include one or more of the following:

(1) a first public land mobile network identifier (PLMN-ID);

(2) a first standalone non-public network identifier (SNPN-ID);

(3) a first single network slice selection assistance information identifier (S-NSSAI ID);

(4) a first network function instance identifier (NF instance ID);

(5) a first network function type (NF type);

(6) a first network function set (NF set); and (7) a first uniform resource identifier (universal resource locator, URI).

The second information may include one or more of the following:

(1) a second PLMN ID;

(2) a second SNPN ID;

(3) a second S-NSSAI ID;

(4) a third NF instance ID;

(5) a second NF type;

(6) a second NF set; and (7) a second URI.

It should be understood that the first PLMN ID and the second PLMN ID are both for identifying a visited network and/or a home network of the NFc. The first SNPN ID and the second SNPN ID are both for identifying a visited network and/or a home network of the NFc. The first S-NSSAI ID and the second S-NSSAI ID are both for identifying network slice information of the NFc. The first NF instance ID and the third NF instance ID are both for identifying a specific network element of the NFc. The first NF type and the second NF type are both for identifying a function type of the NFp or the NFc. The first NF set and the second NF set are both for identifying a service list provided by the NFp or the NFc. The first URI and the second URI are both for identifying a character string of an Internet resource name.

It should be noted that each piece of information in the first information or the second information may be an identifier (ID), or may be an ID list. This is not specifically limited in this embodiment of this application.

It may be understood that specific content of the first information corresponds to specific content of the second information.

For example, when the first information includes the first SNPN ID, the second information includes the second SNPN ID. For another example, when the first information includes the first SNPN ID and the first PLMN ID, the second information includes the second SNPN ID and the second PLMN ID. For still another example, when the first information includes the first SNPN ID, the first PLMN ID, and the first NF instance ID, the second information includes the second SNPN ID, the second PLMN ID, and the third NF instance ID.

Optionally, the second information is carried in an extension field of the certificate.

S402: The NRF determines, through verification, whether the first information matches the second information.

Specifically, after receiving the first token request, the NRF performs S402 to determine, through verification, whether the first information matches the second information. When determining that the first information matches the second information, the NRF performs S403A to S404. When determining that the first information does not match the second information, the NRF performs S403B, to return, to the first network element, response information indicating that the token request fails, or reject the token request from the NFc.

In this embodiment of this application, a specific implementation in which the NRF determines, through verification, whether the first information matches the second information includes but is not limited to the following two types.

Implementation 1: If determining that the first information is the same as the second information, the NRF determines that the first information matches the second information.

For example, when the first information is the first PLMN ID, and the second information is the second PLMN ID, if the first PLMN ID and the second PLMN ID are the same, for example, both are 1, the NRF determines that the first information matches the second information.

Implementation 2: If determining that the first information is a subset of the second information, the NRF determines that the first information matches the second information.

For example, when the first information is the first SNPN ID, the second information is the second SNPN ID, the first SNPN ID Is 1, and the second SNPN ID is {1, 2, 4}, the first SNPN ID is a subset of the second SNPN ID, and the NRF determines that the first information matches the second information.

It should be understood that when both the first information and the second information include a plurality of pieces of information, that the NRF determines that the first information matches the second information specifically includes: The NRF determines that the information included in the first information matches the information included in the second information in a one-to-one correspondence.

For example, when the first information includes the first PLMN ID, the first SNPN ID, the first S-NSSAI ID, and the first NF instance ID, and the second information includes the second PLMN ID, the second SNPN ID, the second S-NSSAI ID, and the third NF instance ID, when determining that the first PLMN ID matches the second PLMN ID, the first SNPN ID matches the second SNPN ID, and the first NF instance ID matches the third NF instance ID, the NRF determines that the first information matches the second information.

S403A: The NRF generates a token.

In a possible implementation, the NRF may generate the token based on the first information carried in the token request and the certificate included in the assertion. To be specific, the generated token may carry the first information and the certificate of the NFc, so that another network element may perform another verification operation based on the first information and the certificate in the token when subsequently using the token.

S403B: The NRF returns a failure response to the first network element, and the first network element receives the failure response, where the failure response indicates that the token request fails.

S404: The NRF sends the token to the first network element, and the first network element receives the token.

It can be learned from the foregoing that, in this embodiment of this application, the first information is carried in the token request, and the second information is carried in the certificate of the NFc, so that the NRF can verify validity of the NFc by verifying a matching relationship between the first information and the second information, and does not rely on a profile of the NFc to verify the validity of the NFc. Therefore, for an NFc whose profile is not stored in the NRF, the NRF may also verify validity of a parameter of the NFc, so that security of using an NF service is effectively improved in this embodiment of this application.

Figure 5:
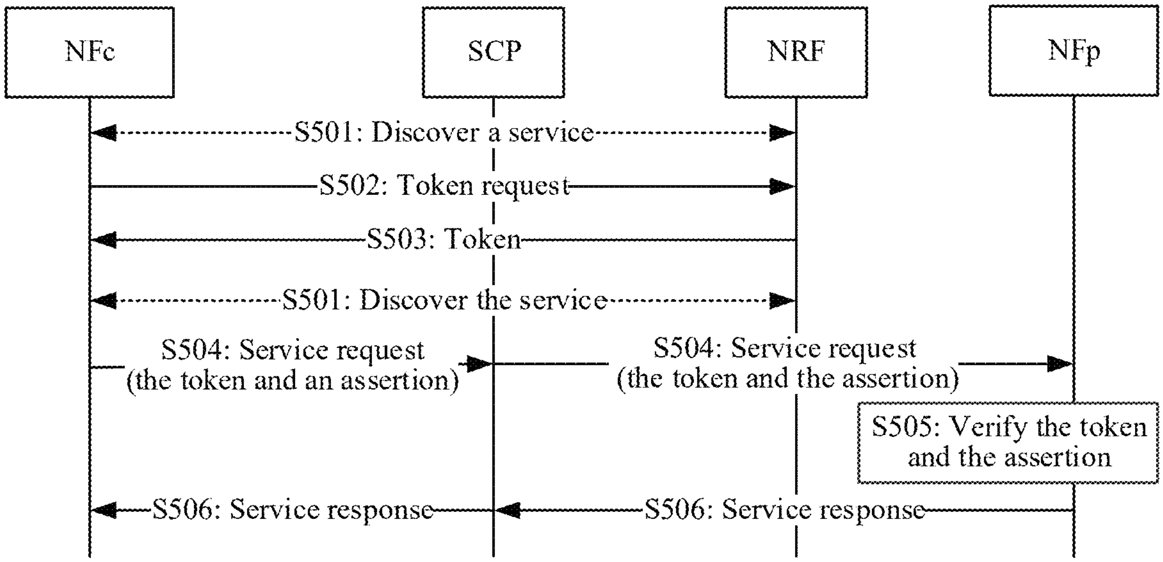
FIG. 5 is a schematic flowchart of a service authorization method.

FIG. 5 is a schematic diagram of a service authorization method. The method includes the following steps.

S501: An NFc and an NRF discover a service.

Specifically, the NFc initiates a service discovery request to the NRF. The NRF receives the service discovery request, and returns, to the NFc, information about an NF service provided by a corresponding NFp.

S502: The NFc sends a token request to the NRF, and the NRF receives the token request.

Specifically, after receiving the token request, the NRF generates a token, and returns the token to the NFc.

S503: The NRF sends the token to the NFc, and the NFc receives the token.

Specifically, after receiving the token, the NFc may perform S501 again to discover the service provided by the NFp, and then perform S504.

S504: The NFc sends a service request to the NFp through an SCP, and the NFp receives the service request through the SCP, where the service request carries the token and the assertion of the NFc.

S505: The NFp verifies the assertion and the token.

Specifically, a process in which the NFp verifies the token may be determining, through verification, whether a regular parameter (for example, validity or a PLMN ID) of the token is valid. A process in which the NFp verifies the assertion may be determining, through verification, whether an NF instance ID in the assertion is consistent with an NF instance ID in the certificate included in the assertion, or verifying a timestamp, expiration time, a network function type of the expected audience, a signature, or the like in the assertion. When the NFp determines that the regular parameter in the token is valid and the NF instance ID in the assertion is consistent with the NF instance ID in the certificate included in the assertion, S506 is performed.

S506: The NFp returns a service response to the NFc through the SCP, and the NFc receives the service response through the SCP.

In the foregoing method, when the NFc directly sends the token request to the NRF, and the NFc sends the service request to the NFp through the SCP, the NFc additionally includes the assertion in the service request, and the NFp determines, through verification, only whether the NF instance ID in the assertion is consistent with the NF instance ID in the certificate included in the assertion. Therefore, when the NF instance ID in the token is inconsistent with the NF instance ID in the assertion, if an attacker illegally obtains the token of the NFc, the attacker may illegally obtain the NF service.

Figure 6:
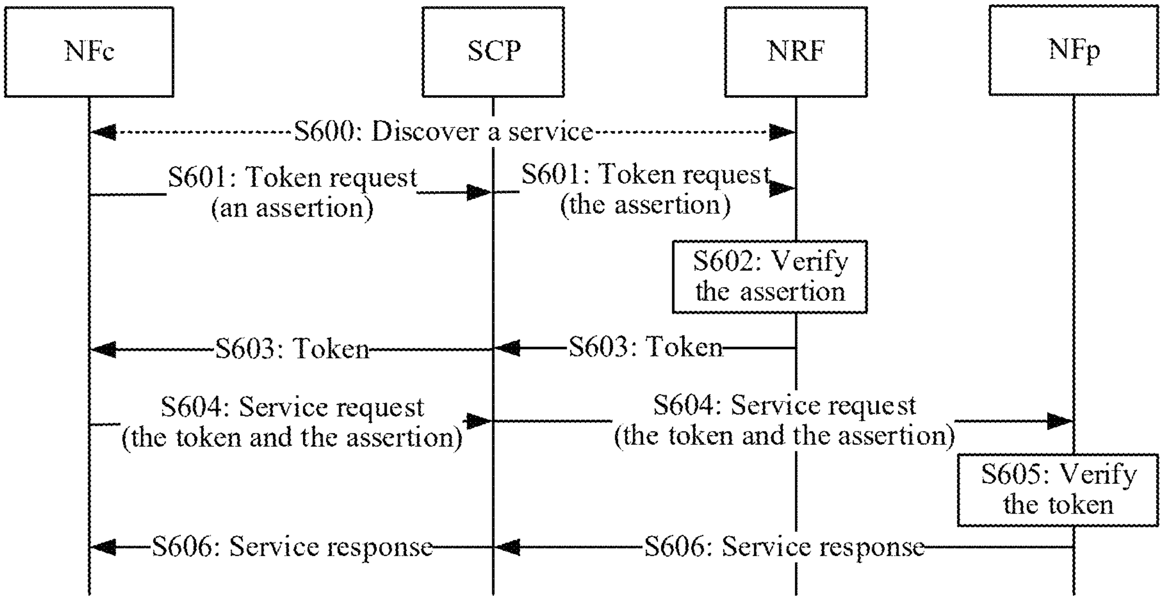
FIG. 6 is a schematic flowchart of another service authorization method.

FIG. 6 is a schematic flowchart of another service authorization method. The method specifically includes the following steps.

S600: An NFc and an NRF discover a service.

Specifically, a specific implementation of S600 is similar to the specific implementation of S501. Refer to the descriptions of S501. Details are not described herein again.

S601: The NFc sends a token request to the NRF through an SCP, and the NRF receives the token request through the SCP, where the token request carries an assertion of the NFc.

S602: The NRF verifies the assertion.

Specifically, a process in which the NRF verifies the assertion may be determining, through verification, whether an NF instance ID in the assertion is consistent with an NF instance ID in a certificate included in the assertion.

S603: An NRF sends a token to the NFc through the SCP, and the NFc receives the token through the SCP.

S604: The NFc sends a service request to an NFp through the SCP, and the NFp receives the service request through the SCP.

S605: The NFp verifies the token.

Specifically, a process in which the NFp verifies the token may be verifying a regular parameter (for example, validity or a PLMN ID) of the token.

S606: The NFp returns a service response to the NFc through the SCP, and the NFc receives the service response through the SCP.

In the foregoing method, when the NFc sends the token request to the NRF through the SCP, and sends the service request to the NFp through the SCP, the NFc includes the assertion of the NFc in both the token request and the service request, and both the NRF and the NFp verifies the assertion. However, a case in which the NF instance ID in the token is inconsistent with the NF instance ID in the assertion still exists. As a result, a case in which an attacker illegally obtains the token from the NRF, and further illegally obtains the NF service still exists.

Figure 7:
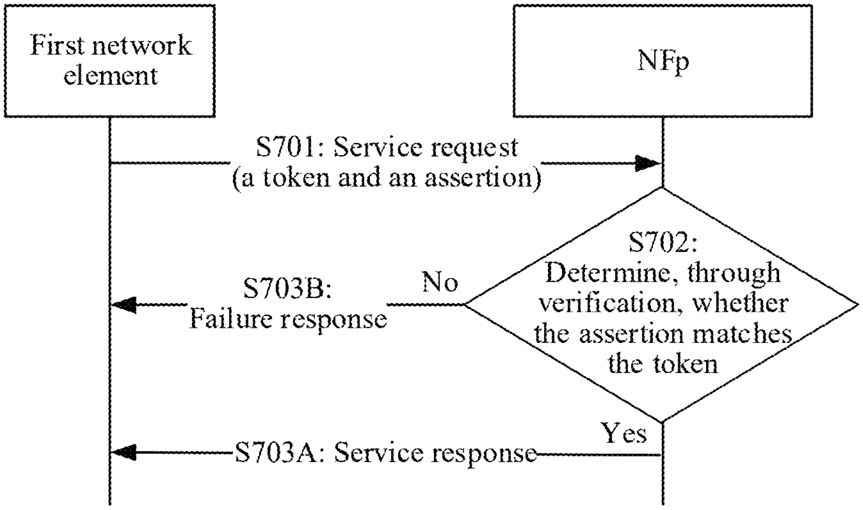
FIG. 7 is a schematic flowchart of a service authorization method according to an embodiment of this application.

To resolve the technical problem that the attacker illegally steals the token of the NFc to illegally obtain the NF service, an embodiment of this application further provides a service authorization method. The method may be applied to the communication system shown in FIG. 1. Refer to FIG. 7. The method includes the following steps.

S701: A first network element sends a service request to an NFp, and the NFp receives the service request.

It may be understood that the service request is for requesting the NFp to provide an NF service for an NFc. The service request includes a token and an assertion. The token includes a first NF instance ID, and the assertion includes a second NF instance ID.

The first network element may be an NFc or an SCP. This is not limited herein.

The NFp in this embodiment of this application may be any network element that has an NF service that can be invoked, for example, the SMF or the UDM in FIG. 2. This is not limited herein.

S702: The NFp determines, through verification, whether the assertion matches the token.

Specifically, a specific process in which the NFp determines, through verification, whether the assertion matches the token may be: The NFp determines, through verification, whether the first NF instance ID in the token is the same as the second NF instance ID in the assertion. When determining that the first NF instance ID is the same as the second NF instance ID, the NFp determines that the assertion matches the token, and performs 5703A. When determining that the first NF instance ID is different from the second NF instance ID, the NFp determines that the assertion does not match the token, and performs 5703B.

For example, when it is assumed that the first NF instance ID is a universally unique identifier (UUID), and the second NF instance ID is a UUID, the NFp determines that the first NF instance ID is the same as the second NF instance ID, that is, determines that the assertion matches the token. For another example, when the first NF instance ID is "###134", and the second NF instance ID is also "###134", the NFp determines that the first NF instance ID is the same as the second NF instance ID, that is, determines that the assertion matches the token.

S703A: The NFp returns a service response to the first network element, and the first network element receives the service response.

In a possible implementation, the first network element is an SCP. After receiving the service response, the SCP sends the service response to the NFc. The service response carries an assertion of the NFp, and the assertion includes a third NF set. After receiving the service response, the NFc determines, through verification, whether a first NF set requested by the NFc matches the third NF set. If the first NF set matches the third NF set, the NFc accesses a corresponding NF service. If the first NF set does not match the third NF set, the NFc re-initiates a service request to the NFp.

In another possible implementation, the first network element is an NFc. The service response carries an assertion of the NFp, and the assertion includes a third NF set. After receiving the service response, the NFc determines, through verification, whether a first NF set requested by the NFc matches the third NF set. If the first NF set matches the third NF set, the NFc accesses a corresponding NF service. If the first NF set does not match the third NF set, the NFc re-initiates a service request to the NFp.

A process in which the NFc determines, through verification, whether the first NF set matches the third NF set may be specifically: determining whether the first NF set is the same as the third NF set, or determining whether an intersection set exists between the first NF set and the third NF set. For example, if the first NF set is 1, and the third NF set is also 1, the NFc determines that the first NF set matches the third NF set. For another example, if the first NF set is {2, 3, 5}, the third NF set is {1, 2, 4}, and there is an intersection set {2} between the first NF set and the third NF set, the NFc determines that the first NF set matches the third NF set.

S703B: The NFp returns a failure response to the first network element, and the first network element receives the failure response, where the failure response indicates that the service request of the first network element fails.

In the service authorization method shown in FIG. 7, the NFp verifies the NF instance ID in the token carried in the service request and the NF instance ID carried in the assertion, to ensure that the token in the service request matches the assertion, and avoid a case in which an attacker illegally steals the token and further illegally obtains the NF service. Therefore, security of using an NF service can be effectively improved in this embodiment of this application.

Figure 8:
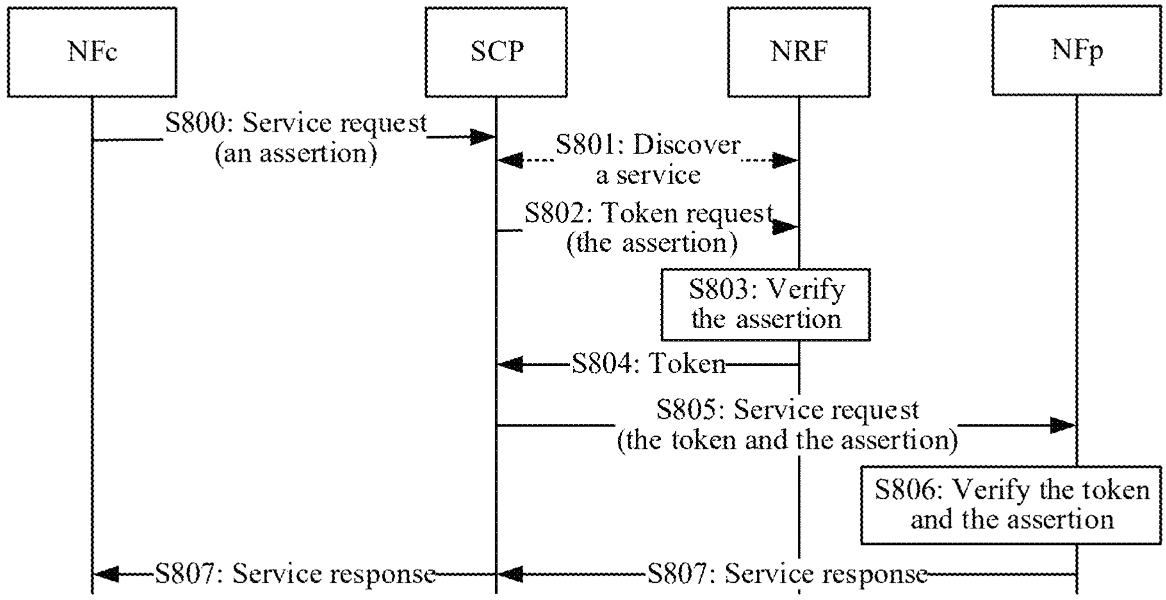
FIG. 8 is a schematic flowchart of another service authorization method.

FIG. 8 is a schematic flowchart of another service authorization method. FIG. 8 shows a scenario in which an NFc sends a service request to an NFp through an SCP, and the service request triggers the SCP to send a token request to an NRF. The method specifically includes the following steps.

S800: An NFc sends a service request to an NRF through an SCP, and the NRF receives the service request through the SCP.

Specifically, the NFc includes an assertion of the NFc in the service request.

S801: The SCP and the NRF discover a service.

Specifically, the SCP initiates a service discovery request to the NRF; receives information returned by the NRF; determines, based on the information, an NF service provided by a registered NFp; and performs S802 to send the token request to the NRF.

S802: The SCP sends a token request to the NRF, and the NRF receives the token request.

Specifically, the SCP includes the assertion of the NFc in the token request.

S803: The NRF verifies the assertion.

Specifically, after receiving the token request, the NRF verifies the assertion in the token request. After the verification succeeds, the NRF generates a token, and performs S804 to send the token to the SCP. If the verification fails, the NRF returns, to the SCP, response information indicating that the token request fails.

S804: The NRF sends the token to the SCP, and the SCP receives the token.

S805: The SCP sends a service request to the NFp, and the NFp receives the service request, where the service request carries the token and the assertion of the NFc.

S806: The NFp verifies the token and the assertion.

A specific implementation of S806 is similar to the specific implementation of S505. Refer to the descriptions of S505. Details are not described herein again. When both the token and the assertion are successfully verified, the NFp performs S807, to return a service response to the NFc through the SCP.

S807: The NFp returns the service response to the NFc through the SCP, and the NFc receives the service response through the SCP.

In the service authorization method shown in FIG. 8, when the NFc sends the service request to the NFp through the SCP, the NFc includes the assertion of the NFc in the service request, and the service request triggers the SCP to send the token request to the NRF. The SCP also includes the assertion in the token request. After obtaining the token, the SCP also includes the assertion in the service request when sending the service request as a proxy for the NFc. Both the NRF and NFp verify the assertion of the NFc. The entire service request process depends on the assertion (for example, that the assertion is successfully verified is a prerequisite for generating the token). Therefore, an attacker may steal an assertion of another NFc and further illegally obtain the NF service.

Figure 9:
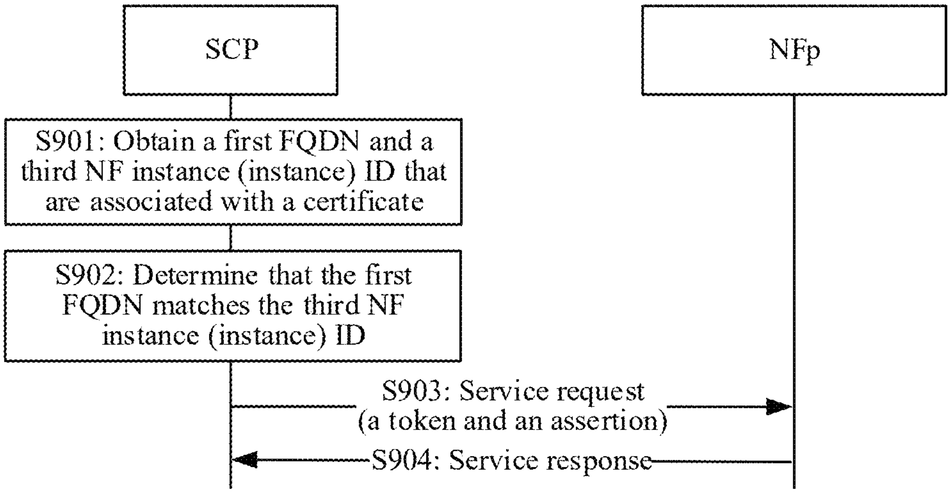
FIG. 9 is a schematic flowchart of a service authorization method according to an embodiment of this application.

To resolve the technical problem that the attacker illegally steals the assertion of the NFc to illegally obtain the NF service, an embodiment of this application further provides a service authorization method. The method may be applied to the communication system shown in FIG. 1. Refer to FIG. 9. The method includes the following steps.

S901: An SCP obtains a first fully qualified domain name (FQDN) and a third NF instance ID that are associated with a certificate.

In this embodiment of this application, the first FQDN may be an FQDN in a transport layer certificate of an NFc, and the third NF instance ID may be an NF instance ID in an application layer certificate of the NFc. Alternatively, the first FQDN and the third NF instance ID may be an FQDN and an NF instance ID in a shared certificate (for example, a certificate shared by a transport layer and an application layer) of an NFc.

S902: The SCP determines that the first FQDN matches the third NF instance ID.

In a possible implementation, the SCP may receive a service request from the NFc. The service request includes the certificate of the NFc. The SCP performs S901 and S902, to obtain, from the certificate, the first FQDN and the third NF instance ID that are associated with the certificate. When the SCP determines that the first FQDN matches the third NF instance ID, the SCP performs S903 to send a service request to an NFp. If the SCP determines that the first FQDN does not match the third NF instance ID, the SCP returns prompt information indicating that the service request fails to the NFc.

In another possible implementation, the SCP may receive a token request from the NFc. The token request includes the certificate of the NFc. The SCP performs S901 and S902, to obtain, from the certificate, the first FQDN and the third NF instance ID that are associated with the certificate. If the SCP determines that the first FQDN matches the third NF instance ID, the SCP sends a token request to an NRF. If the SCP determines that the first FQDN does not match the third NF instance ID, the SCP returns prompt information indicating that the token request fails to the NFc.

In a possible implementation, the SCP may determine, based on a binding relationship between an FQDN and an NF instance ID, whether the first FQDN matches the third NF instance ID.

In this embodiment of this application, there are a plurality of implementations in which the SCP determines, based on the binding relationship, whether the first FQDN matches the third NF instance ID, including but not limited to the following three implementations.

Implementation 1: The SCP extracts the first FQDN from the transport layer certificate of the NFc, and sends a binding relationship query request to the NRF, where the binding relationship query request carries the first FQDN. The SCP receives a corresponding NF instance ID returned by the NRF, and determines whether the NF instance ID is consistent with the third NF instance ID in the application layer certificate in the assertion carried in the token request. If the NF instance ID is consistent with the third NF instance ID, the SCP determines that the first FQDN matches the third NF instance ID. If the NF instance ID is inconsistent with the third NF instance ID, the SCP determines that the first FQDN does not match the third NF instance ID.

Implementation 2: The SCP extracts the third NF instance ID from the application layer certificate in the assertion of the NFc, and sends a binding relationship query request to the NRF, where the binding relationship query request carries the third NF instance ID. The SCP receives a corresponding FQDN returned by the NRF, and determines whether the FQDN is consistent with the first FQDN in the transport layer certificate of the NFc. If the FQDN is consistent with the first FQDN, the SCP determines that the first FQDN matches the third NF instance ID. If the FQDN is inconsistent with the first FQDN, the SCP determines that the first FQDN does not match the third NF instance ID.

Implementation 3: The SCP extracts the first FQDN from the transport layer certificate of the NFc, extracts the third NF instance ID from the application layer certificate in the assertion of the NFc, and sends a binding relationship query request to the NRF, where the binding relationship query request carries the third NF instance ID and the first FQDN. The SCP receives a matching result returned by the NRF, where the matching result may directly indicate whether the first FQDN matches the third NF instance ID.

Optionally, the binding relationship may be obtained by the SCP from a certificate authority/registration authority (CA/RA) entity. Alternatively, the binding relationship may be obtained by the NRF from a CA/RA in advance and locally stored, and then obtained by the SCP from the NRF.

S903: The SCP sends a service request to the NFp, and the NFp receives the service request.

Specifically, the SCP may include the assertion and a token of the NFc in the service request. After receiving the service request, the NFp may determine, through verification, whether the assertion matches the token. When determining that the assertion matches the token, the NFp performs S904, to return a service response to the SCP. When determining that the assertion does not match the token, the NFp rejects the service request.

S904: The NFp returns a service response to the SCP, and the SCP receives the service response.

Specifically, after receiving the service response, the SCP may further send the service response to the NFc, and the NFc receives the service response.

In the service authorization method shown in FIG. 9, before sending the service request to the NFp, the SCP first verifies a matching relationship between the FQDN and the NF instance ID that are in the assertion of the NFc and that are associated with the certificate, and sends the service request to the NFp only after the verification succeeds. Therefore, a case in which an attacker illegally steals the assertion and further illegally obtains the NF service can be avoided, and security of using the NF service can be effectively improved.

In this embodiment of this application, the binding relationship may be alternatively verified by another network element. For example, after receiving a token request from a first network element, the NRF may verify the binding relationship before delivering a token to the first network element. For details, refer to FIG. 10. The following steps are included.

S1001: A first network element sends a token request to an NRF, and the NRF receives the token request, where the token request carries an assertion of an NFc.

In a possible implementation, the first network element is an SCP. After receiving a service request or a token request from the NFc, the SCP sends the token request to the NRF.

In another possible implementation, the first network element is the NFc. The NFc directly sends the token request to the NRF.

S1002: The NRF obtains a first FQDN and a third NF instance ID that are associated with a certificate.

In a possible implementation, the token request carries the assertion of the NFc, and the assertion includes an application layer certificate and a transport layer certificate of the NFc. The NRF may extract the FQDN from the transport layer certificate of the NFc, and extract the third NF instance ID from the application layer certificate of the NFc.

It should be understood that the transport layer certificate may be sent by the first network element to the NRF when a transport layer link is established between the first network element and the NRF.

In another possible implementation, the token request carries the assertion of the NFc, the assertion includes a shared certificate of an application layer and a transport layer of the NFc. The NRF may extract the first FQDN and/or the third NF instance ID from the shared certificate.

S1003: The NRF determines that the first FQDN matches the third NF instance ID.

In a possible implementation, after receiving the token request from the first network element, the NRF may determine, based on a locally stored binding relationship between an FQDN and an NF instance ID, whether the first FQDN matches the third NF instance ID. Specifically, if the NRF determines that the first FQDN and the third NF instance ID are respectively in a one-to-one correspondence with the FQDN and the NF instance ID in the binding relationship, the NRF determines that the first FQDN matches the third NF instance ID, generates a token, and performs S1004. If the NRF determines that the first FQDN and the third NF instance ID are not respectively in a one-to-one correspondence with the FQDN and the NF instance ID in the binding relationship, the NRF determines that the first FQDN does not match the third NF instance ID, and returns, to the first network element, response information indicating that the token request fails, or rejects the token request of the first network element.

In another possible implementation, after receiving the token request from the first network element, the NRF may obtain a related parameter (an FQDN and/or an NF instance ID) of the binding relationship from a CA/RA, and determine, based on the related parameter of the binding relationship, whether the first FQDN matches the third NF instance ID. A specific implementation in which the NRF obtains the related parameter of the binding relationship from the CA/RA is described in detail in an embodiment shown in FIG. 12.

S1004: The NRF returns the token to the first network element, and the first network element receives the token.

In a possible implementation, the first network element is an SCP. After receiving the token, the SCP forwards the token to the NFc.

In another possible implementation, the first network element is the NFc, and the NFc receives the token from the NRF.

Figure 10:
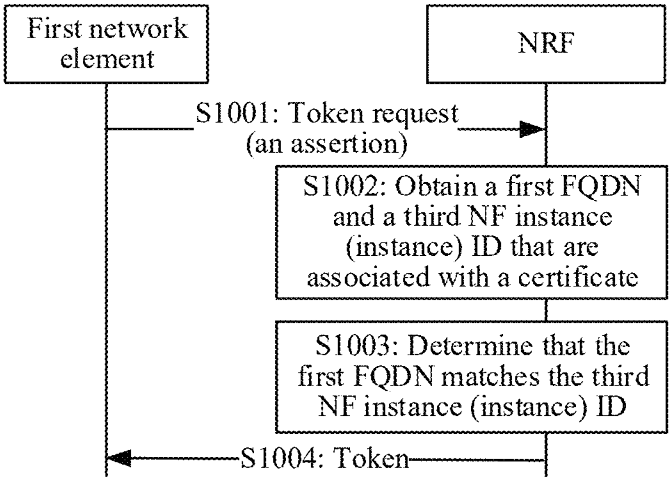
FIG. 10 is a schematic flowchart of a service authorization method according to an embodiment of this application.

In the service authorization method shown in FIG. 10, before returning the token to the first network element, the NRF first verifies a matching relationship between the FQDN and the NF instance ID that are in the assertion of the NFc and that are associated with the certificate, and returns the token only after the verification succeeds. The NFc or the SCP can initiate the service request only after receiving the token. Therefore, a case in which an attacker illegally steals the assertion and further illegally obtains the NF service can be avoided, and security of using the NF service can be effectively improved.

Optionally, the binding relationship between the FQDN and the NF instance ID may be generated by the CA/RA when the NFc applies to the CA/RA for the certificate.

The following describes a method of applying for the certificate.

Figure 11:
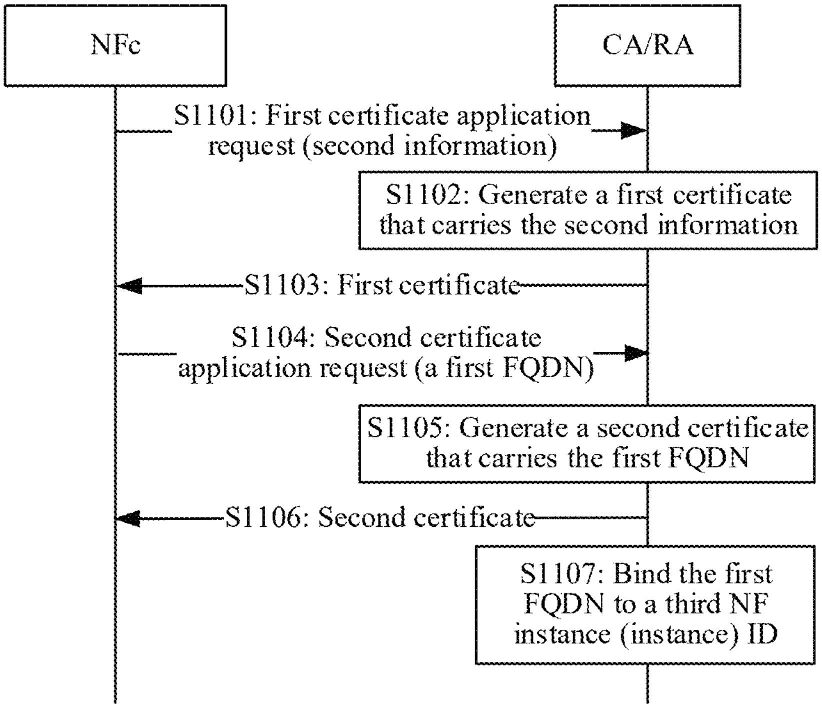
FIG. 11 is a schematic flowchart of certificate application according to an embodiment of this application.

FIG. 11 is a schematic diagram of a certificate application method. The method includes the following steps.

S1101: An NFc sends a first certificate application request to a CA/RA, and the CA/RA receives the first certificate application request.

Specifically, the first certificate application request includes a certificate template, and the certificate template includes second information. The second information may include one or more pieces of information such as a third NF instance ID, a second PLMN ID, a second SNPN ID, a second S-NSSAI ID, a second NF type, a second NF set, and a second URI. After receiving the first certificate application request, the CA/RA may generate a first certificate based on the second information.

S1102: The CA/RA generates the first certificate that carries the second information.

It should be understood that the first certificate may be an application layer certificate of the NFc.

S1103: The CA/RA returns the first certificate to the NFc, and the NFc receives the first certificate.

S1104: The NFc sends a second certificate application request to the CA/RA, and the CA/RA receives the second certificate application request.

Specifically, the second certificate application request includes the certificate template, and the certificate template includes a first FQDN. After receiving the first certificate application request, the CA/RA may generate a second certificate based on the first FQDN.

S1105: The CA/RA generates the second certificate that carries the first FQDN.

It should be understood that the second certificate may be a transport layer certificate of the NFc.

S1106: The CA/RA returns the second certificate to the NFc, and the NFc receives the second certificate.

S1107: The CA/RA binds the third NF instance ID in the second information to the first FQDN, to generate a binding relationship between the third NF instance ID and the first FQDN.

Optionally, the first certificate and the second certificate may be combined into one certificate. Therefore, the NFc needs to apply to the CA/RA for a certificate only once. The NFc may include, in a certificate application request sent to the CA/RA, a certificate template including the first FQDN and the second information. After receiving the certificate application request, the CA/RA may generate, based on the certificate template in the certificate application request, a certificate carrying the first FQDN and the second information, and the binding relationship between the third NF instance ID and the first FQDN.

The following describes a method in which an NRF obtains a binding relationship.

Figure 12:
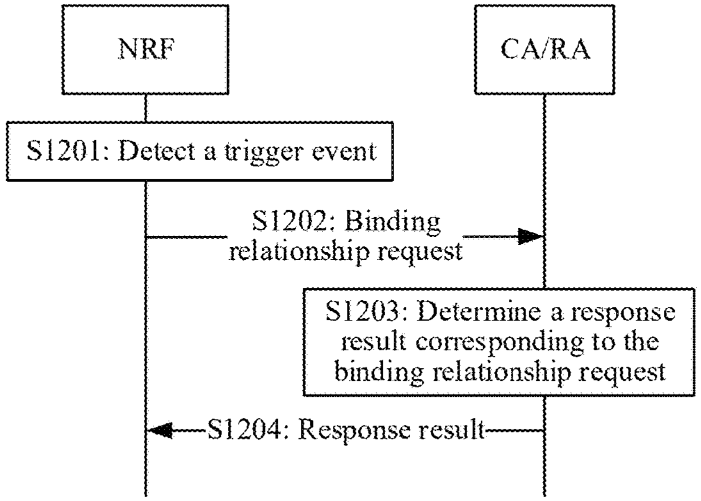
FIG. 12 is a schematic flowchart of a method of obtaining a binding relationship by an NRF according to an embodiment of this application.

FIG. 12 is a flowchart of a method in which an NRF obtains a binding relationship. The method includes the following steps.

S1201: An NRF detects a trigger event.

The trigger event may be that the NRF receives an NF service registration request from an NFp, that the NRF receives a service discovery request from an NFc, or that the NRF receives a service request from an NFc. This is not specifically limited in this embodiment of this application.

S1202: The NRF sends a binding relationship request to a CA/RA, and the CA/RA receives the binding relationship request.

In a possible implementation, the NRF carries a certificate in the binding relationship request. The certificate may be a transport layer certificate (a certificate including a first FQDN) of an NFc, an application layer certificate (a certificate including a third NF instance ID) of an NFc, or a certificate (namely, a certificate including the first FQDN and the third NF instance ID) shared by a transport layer and an application layer of an NFc.

In another possible implementation, the NRF carries a certificate association parameter in the binding relationship request. The parameter may be a first FQDN in a transport layer certificate of an NFc, a third NF instance ID in an application layer certificate of an NFc, or a first FQDN in a transport layer certificate of an NFc and a third NF instance ID in an application layer certificate.

S1203: The CA/RA determines a response result corresponding to the binding relationship request.

In this embodiment of this application, if the binding relationship request received by the CA/RA carries the transport layer certificate of the NFc, the CA/RA determines that the response result is the application layer certificate in the binding relationship. If the binding relationship request received by the CA/RA carries the application layer certificate of the NFc, the CA/RA determines that the response result is the transport layer certificate in the binding relationship. If the binding relationship request received by the CA/RA carries the shared certificate of the transport layer and the application layer of the NFc, the CA/RA determines that the response result is a matching result of the FQDN and the NF instance ID.

Correspondingly, if the binding relationship request received by the CA/RA carries the first FQDN in the transport layer certificate of the NFc, the CA/RA determines that the response result is the NF instance ID in the binding relationship. If the binding relationship request received by the CA/RA carries the third NF instance ID in the application layer certificate of the NFc, the CA/RA determines that the response result is the FQDN in the binding relationship. If the binding relationship request received by the CA/RA carries the first FQDN and the third NF instance ID in the shared certificate of the transport layer and the application layer of the NFc, the CA/RA determines that the response result is a matching result of the first FQDN and the third NF instance ID.

S1204: The CA/RA returns the response result to the NRF, and the NRF receives the response result.

Specifically, after determining the corresponding response result based on the parameter carried in the binding relationship request, the CA/RA returns the response result to the NRF.

Optionally, after receiving the response result, the NRF may determine, based on the response result, whether the first FQDN matches the third NF instance ID, where the first FQDN and the third NF instance ID are associated with a certificate included in an assertion of the NFc carried in a service request received by the NRF from an SCP, and send the matching result to the SCP.

It should be understood that the foregoing separately provides corresponding technical solutions for the three technical problems. In actual application, the foregoing implementations may be combined with each other to implement different technical solutions and technical effects. The following provides detailed descriptions by using several specific examples.

Example 1

Figure 13:
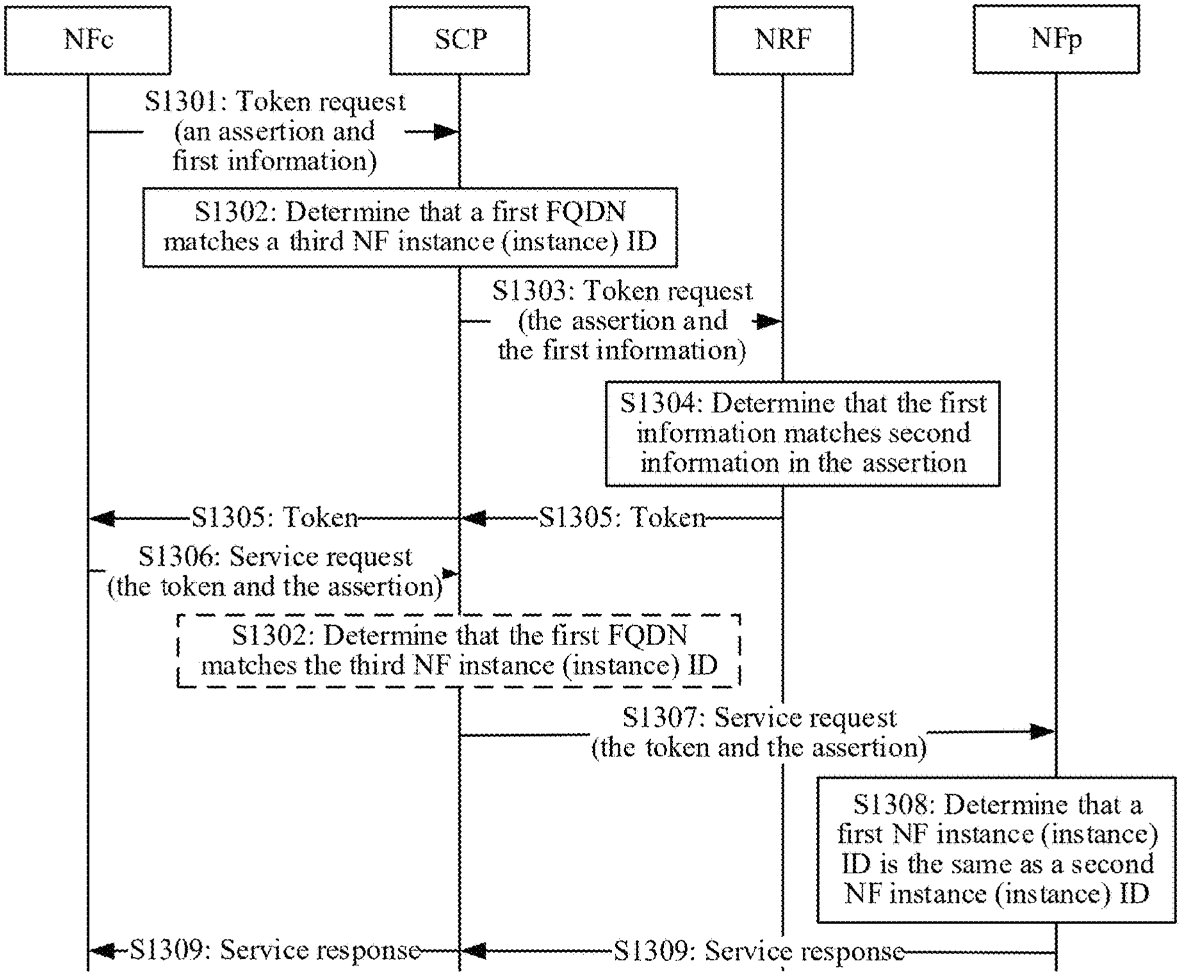
FIG. 13 is a flowchart of a service authorization method according to an embodiment of this application.

As shown in FIG. 13, with reference to the technical solutions shown in FIG. 4, FIG. 7, and FIG. 9, an embodiment of this application provides a service authorization method. The method is applied to the application scenario shown in FIG. 3A, and the method includes the following steps.

S1301: An NFc sends a token request to an SCP, and the SCP receives the token request.

For example, the NFc may be the SMF, the AMF, or the like in the communication system shown in FIG. 2.

The token request carries an assertion and first information of the NFc. The assertion includes a certificate of the NFc, and the certificate includes second information of the NFc. For specific content of the first information and the second information, refer to the related descriptions in S401. Details are not described herein again.

S1302: The SCP determines that a first FQDN matches a third NF instance ID.

The first FQDN may be an FQDN in a transport layer certificate of the NFc, and the third NF instance ID may be an NF instance ID in an application layer certificate of the NFc. Alternatively, the first FQDN and the third NF instance ID may be an FQDN and an NF instance ID in a certificate shared by a transport layer and an application layer of the NFc.

Specifically, the SCP may determine, based on a binding relationship between an FQDN and an NF instance ID, whether the first FQDN matches the third NF instance ID.

It may be understood that a specific implementation in which the SCP determines, based on the binding relationship, that the first FQDN matches the third NF instance ID in S1302 is similar to the specific implementation of S902. Details are not described herein again.

Optionally, after performing S1302, the SCP may locally store the binding relationship between the FQDN and the NF instance ID or a related parameter (such as the FQDN and the NF instance ID) in the binding relationship.

S1303: The SCP sends the token request to an NRF, and the NRF receives the token request.

Specifically, the token request carries the assertion and the first information, the certificate in the assertion carries the second information, and the first information includes a first NF instance ID. After receiving the token request and before generating a token, the NRF performs S1304 to determine whether the first information matches the second information. When determining that the first information matches the second information, the NRF generates the token carrying the certificate and the first NF instance ID, and performs S1305 to return the token to the NFc through the SCP. If determining that the first information does not match the second information, the NRF returns, to the NFc through the SCP, prompt information indicating that the token request fails, or rejects the token request of the NFc.

S1304: The NRF determines that the first information matches the second information.

It may be understood that a specific implementation in which the NRF determines, through verification, whether the first information matches the second information in S1304 is similar to the specific implementation of S402. Details are not described herein again.

S1305: The NRF sends the token to the NFc through the SCP, and the NFc receives the token through the SCP.

S1306: The NFc sends a service request to the SCP, and the SCP receives the service request.

Specifically, the NFc includes the assertion and the token of the NFc in the service request, and the SCP may further perform S1302 again to determine whether there is matching between the first FQDN and the third NF instance ID that are associated with the certificate in the assertion; or determine, through verification based on the binding relationship or the related parameter in the binding relationship stored in S1302, whether there is matching between the first FQDN and the third NF instance ID that are associated with the certificate included in the service request.

S1307: The SCP sends a service request to an NFp, and the NFp receives the service request.

Specifically, the service request carries the assertion and the token of the NFc, the token includes the first NF instance ID, and the assertion includes a second NF instance ID. After receiving the service request, the NFp performs S1308.

S1308: The NFp determines whether the first NF instance ID is the same as the second NF instance ID.

Specifically, the NFp determines, through verification, whether the first NF instance ID in the token is the same as the second NF instance ID in the assertion. If the first NF instance ID is the same as the second NF instance ID, the NFp performs S1309. If the first NF instance ID is different from the second NF instance ID, the NFp returns, to the NFc through the SCP, information indicating that the service request fails.

It may be understood that a specific implementation in which the NFp determines, through verification, whether the first NF instance ID is the same as the second NF instance ID in S1308 is similar to the specific implementation of S702. Details are not described herein again.

S1309: The NFp returns a service response to the NFp through the SCP, and the NFp receives the service response through the SCP.

It may be understood that a specific implementation of S1309 is similar to the specific implementation of S703A. Details are not described herein again.

In the technical solution shown in FIG. 13, the NRF verifies a matching relationship between the first information of the NFc and the second information carried in the certificate of the assertion of the NFc that are carried in the token request, the NFp verifies a matching relationship between the first NF instance ID in the token of the NFc and the second NF instance ID in the assertion that are carried in the service request, and the SCP verifies a matching relationship between the first FQDN and the third NF instance ID that are associated with the certificate in the NFc carried in the service request. This effectively avoids a case in which an attacker illegally steals the token, forges the assertion, and further illegally obtain an NF service. In addition, validity of the NFc does not need to be determined through verification by using a profile of the NFc. Therefore, the NRF can also verify validity of a parameter of the NFc whose profile is not stored in the NRF. Therefore, in this embodiment of this application, security of using the NF service can be effectively improved.

Example 2

A difference between Example 2 and Example 1 lies in that: In Example 1, the token request is initiated by the NFc to the NRF through the SCP, and only after receiving, through the SCP, the token returned by the NRF, the NFc initiates the service request. In Example 2, the NFc directly sends the service request to the NRF through the SCP, to trigger the SCP to initiate, as a proxy for the NFc, the token request to the NRF.

Figure 14:
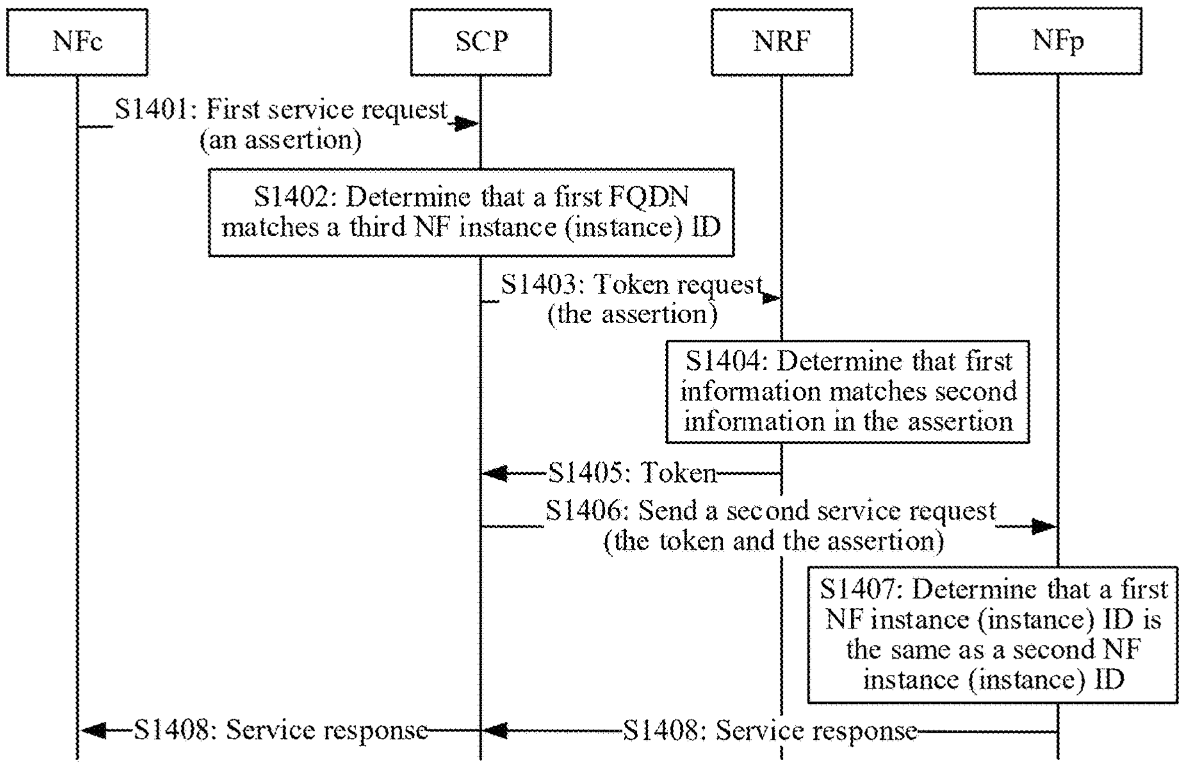
FIG. 14 is a flowchart of a service authorization method according to an embodiment of this application.

As shown in FIG. 14, with reference to the technical solutions shown in FIG. 4, FIG. 7, and FIG. 9, an embodiment of this application provides another service authorization method. The method may be applied to the application scenario shown in FIG. 3B, and the method includes the following steps.

S1401: An NFc sends a first service request to an SCP, and the SCP receives the first service request.

S1402: The SCP determines that a first FQDN matches a third NF instance ID.

The first FQDN may be an FQDN in a transport layer certificate, and the third NF instance ID may be an NF instance ID in an application layer certificate of the NFc. Alternatively, the first FQDN and the third NF instance ID may be an FQDN and an NF instance ID in a certificate shared by a transport layer and an application layer of the NFc.

Specifically, the first service request carries an assertion and first information of the NFc, and the assertion includes the transport layer certificate and the application layer certificate of the NFc, or the certificate shared by the transport layer and the application layer. The SCP may extract the first FQDN and/or the third NF instance ID from these certificates, and perform step S1402 to determine that the first FQDN matches the third NF instance ID. It may be understood that a specific implementation of S1402 is similar to the specific implementation of S902. Refer to the description of S902. Details are not described herein again.

S1403: The SCP sends a token request to the NRF, and the NRF receives the token request.

Specifically, the token request carries the assertion and the first information of the NFc, the assertion includes a certificate of the NFc, and the certificate includes second information. For specific content of the first information and the second information, refer to the related descriptions in S401. Details are not described herein again.

Specifically, the first information includes a first NF instance ID. After receiving the token request and before generating a token, the NRF performs step S1404: determining, through verification, whether the first information matches the second information. When determining that the first information matches the second information, the NRF generates the token carrying the certificate and the first NF instance ID, and performs S1405 to return the token to the NFc through the SCP. If determining that the first information does not match the second information, the NRF returns, to the NFc through the SCP, prompt information indicating that the token request fails, or rejects the token request of the NFc.

S1404: The NRF determines that the first information matches the second information.

It may be understood that a specific implementation in which the NRF determines, through verification, whether the first information matches the second information in S1404 is similar to the specific implementation of S402. Details are not described herein again.

S1405: The NRF sends the token to the SCP, and the SCP receives the token.

S1406: The SCP sends a second service request to an NFp, and the NFp receives the second service request.

Specifically, the second service request carries the token and the assertion of the NFc, the token includes the first NF instance ID, and the assertion includes a second NF instance ID.

S1407: The NFp determines that the first NF instance ID is the same as the second NF instance ID.

Specifically, after receiving the second service request, the NFp determines, through verification, whether the first NF instance ID is the same as the second NF instance ID. If the first NF instance ID is the same as the second NF instance ID, the NFp performs S1408: returning a service response to the NFc through the SCP. If the first NF instance ID is different from the second NF instance ID, the NFp returns, through the SCP, information indicating the service request fails to the NFc.

It may be understood that a specific implementation in which the NFp determines, through verification, whether the first NF instance ID is the same as the second NF instance ID in S1407 is similar to the specific implementation of S702. Details are not described herein again.

S1408: The NFp returns the service response to the NFc through the SCP, and the NFc receives the service response through the SCP.

It may be understood that a specific implementation of S1408 is similar to the specific implementation of S703A. Details are not described herein again.

In the technical solution shown in FIG. 14, the SCP verifies a matching relationship between the first FQDN and the third NF instance ID that are associated with the certificate in the assertion of the NFc carried in the first service request from the NFc, the NRF verifies a matching relationship between the first information and the second information that are carried in the token request from the SCP, and the NFp verifies a matching relationship between the first NF instance ID in the token and the second NF instance ID in the assertion that are carried in the second service request from the SCP. This effectively avoids a case in which an attacker illegally steals the token, forges the assertion, and further illegally obtains an NF service. In addition, validity of the NFc does not need to be verified by using a profile of the NFc. Therefore, the NRF can also verify validity of parameters of the NFc whose profile is not stored in the NRF. Therefore, in this embodiment of this application, security of using the NF service can be effectively improved, and the SCP does not need to repeatedly verify the matching relationship between the first FQDN and the third NF instance ID that are associated with the certificate in the assertion of the NFc. This effectively reduces computing resources.

Example 3

A difference between this example and Example 1 and Example 2 is as follows: In Example 3, the NFc directly initiates a token request to the NRF, and after receiving a token returned by the NRF, sends a service request to the SCP. After receiving the service request, the SCP verifies a matching relationship between a first FQDN and a third NF instance ID that are associated with a certificate in an assertion carried in the service request.

Figure 15:
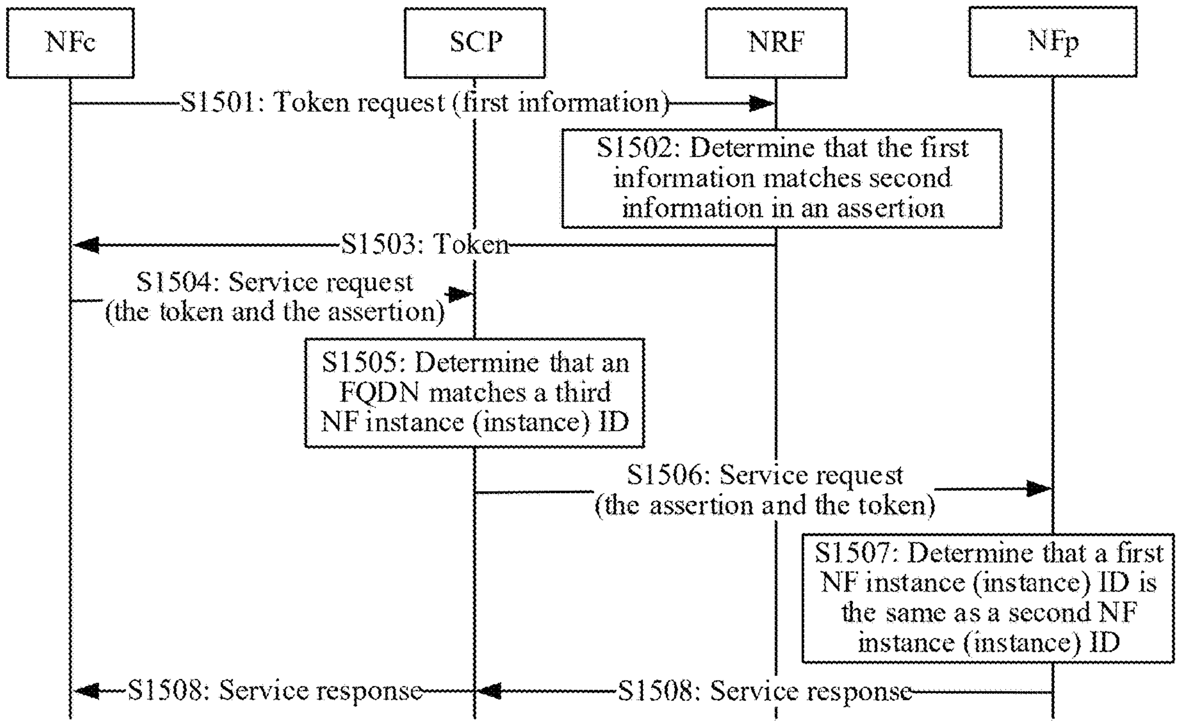
FIG. 15 is a flowchart of another service authorization method according to an embodiment of this application.

As shown in FIG. 15, with reference to the technical solutions shown in FIG. 4, FIG. 7, and FIG. 9, an embodiment of this application provides still another service authorization and request method. The method may be applied to the application scenario shown in FIG. 3C, and the method includes the following steps.

S1501: An NFc sends a token request to an NRF, and the NRF receives the token request.

Specifically, the token request carries first information of the NFc. After receiving the token request, the NRF obtains a certificate of the NFc, where the certificate includes second information. The NRF performs S1502: determining, through verification, whether the first information matches the second information. If the first information matches the second information, the NRF performs 1503. If the first information does not match the second information, the NRF returns, to the NFc, indication information indicating that the token request fails, or rejects the token request of the NFc.

In this embodiment of this application, the certificate of the NFc obtained by the NRF may be a certificate of the NFc obtained by the NRF when the NRF establishes a transport layer link to the NFc, may be a certificate of the NFc preconfigured on the NRF, or may be a certificate of the NFc carried in the token request.

S1502: The NRF determines that the first information matches the second information.

It may be understood that a specific implementation in which the NRF determines, through verification, whether the first information matches the second information in S1502 is similar to the specific implementation of S302. Refer to the related description of S402. Details are not described herein again.

S1503: The NRF sends a token to the NFc, and the NFc receives the token.

Specifically, before sending the token to the NFc, the NRF generates the token carrying the certificate and a first NF instance ID.

S1504: The NFc sends a service request to the SCP, and the SCP receives the service request.

Specifically, the service request carries a token and an assertion of the NFc, and the assertion includes a certificate of the NFc. After receiving the service request, the SCP may determine a first FQDN and a third NF instance ID that are associated with the certificate, and perform S1505 to determine whether the first FQDN matches the third NF instance ID. If determining that the first FQDN matches the third NF instance ID, the SCP continues to perform S1506. If determining that the first FQDN does not match the third NF instance ID, the SCP returns, to the NFc, indication information indicating that the service request fails.

S1505: The SCP determines that a first FQDN matches a third NF instance ID.

It may be understood that a specific implementation in which the SCP determines that the first FQDN matches the third NF instance ID in S1505 is similar to the specific implementation of S902. Details are not described herein again.

S1506: The SCP sends a service request to an NFp, and the NFp receives the service request.

Specifically, the service request carries the assertion and the token of the NFc, the token carries the first NF instance ID, and the assertion carries a second NF instance ID.

S1507: The NFp determines that the first NF instance ID is the same as the second NF instance ID.

Specifically, after receiving the service request, the NFp determines, through verification, whether the first NF instance ID is the same as the second NF instance ID. If the first NF instance ID is the same as the second NF instance ID, the NFp performs S1508: returning a service response to the NFc through the SCP. If the first NF instance ID is different from the second NF instance ID, the NFp returns, through the SCP, information indicating the service request fails to the NFc.

It may be understood that a specific implementation in which the NFp determines, through verification, whether the first NF instance ID is the same as the second NF instance ID in S1507 is similar to the specific implementation of S702. Details are not described herein again.

S1508: The NFp returns the service response to the NFc through the SCP, and the NFc receives the service response through the SCP.

It may be understood that a specific implementation of S1508 is similar to the specific implementation of S703A. Details are not described herein again.

In the technical solution shown in FIG. 15, the NRF verifies a matching relationship between the first information carried in the token request from the NFc and the second information in the certificate, the SCP verifies a matching relationship between the first FQDN and the third NF instance ID that are associated with the certificate in the assertion carried in the service request from the NFc, and the NFP verifies a matching relationship between the first NF instance ID in the token of the NFc and the second NF instance ID in the assertion of the NFc that are carried in the service request from the SCP. This avoids a case in which an attacker illegally steals the token, forges the assertion, and further illegally obtains an NF service. In addition, the NRF can also verify validity of parameters of the NFc whose profile is not stored in the NRF. This can effectively improve security of using the NF service in this embodiment of this application.

Certainly, in actual application, in addition to the foregoing three examples, there may be more other combined solutions, which are not listed one by one herein.

To better understand the foregoing solutions of embodiments of this application, several NF instance IDs in the foregoing embodiments of this application are further clarified herein. The first NF instance ID is the NF instance ID carried in the token request of the NFc or the NF instance ID in the token, the second NF instance ID is the NF instance ID carried in the assertion of the NFc, and the third NF instance ID is the NF instance ID carried in the assertion of the NFc.

It should be noted that, in addition to information listed in embodiments of this application, messages such as the token request, the token, the service request, or the service response in embodiments of this application may further include other information. This is not limited in this application.

Figure 16:
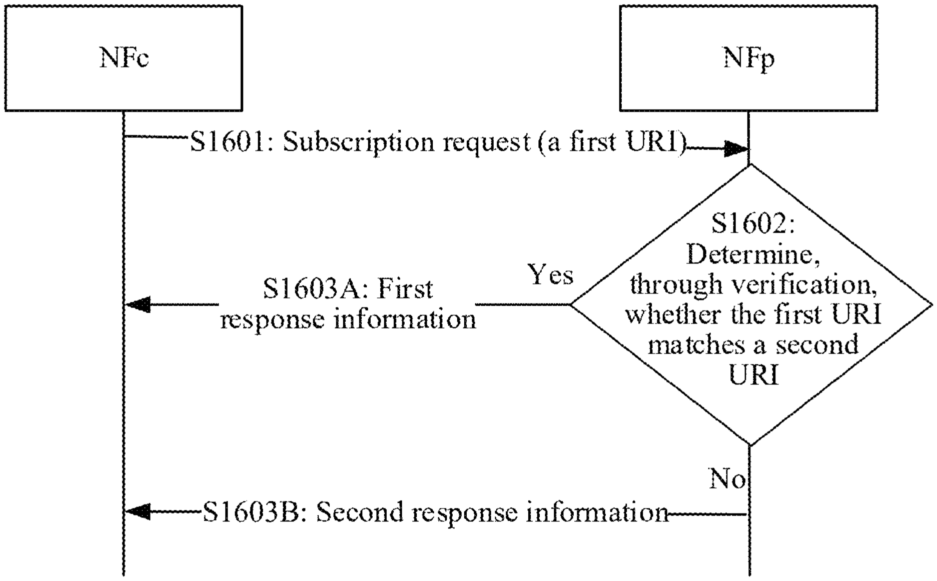
FIG. 16 is a flowchart of a service authorization method according to an embodiment of this application.

In an application scenario in which the NFc subscribes to an NF service from the NFp, some attackers may carry illegal URIs in a subscription request to illegally obtain notification information of the NF service. As a result, network information of the NF service is disclosed. In view of this, an embodiment of this application further provides a service authorization method. Refer to FIG. 16. The method includes the following steps.

S1601: An NFc sends a subscription request to an NFp, and the NFp receives the subscription request.

In a possible implementation, the subscription request carries a first URI of the NFc and a certificate of the NFc, and the certificate includes a second URI. In this case, the NFp may obtain the first URI and the second URI from the subscription request.

In another possible implementation, the subscription request carries a first URI of the NFc, and the NFp obtains a certificate of the NFc in another manner, for example, obtains the certificate of the NFc from a transport layer, and then obtains a second URI from the certificate of the NFc. In this case, the NFp may also obtain the first URI and the second URI.

S1602: The NFp determines, through verification, whether the first URI matches the second URI in the certificate.

Specifically, a process in which the NFp determines, through verification, whether the first URI matches the second URI may specifically include: determining that the first URI is consistent with the second URI, or determining that the first URI is a subset of the second URI. For example, if the first URI is "##8888", and the second URI is also "##8888", the NFp determines that the first URI matches the second URI. For another example, if the first URI is "123", the second URI is {123, 456}, and the first NF URI is a subset of the second NF URI, the NFp determines that the first NF URI matches the second NF URI. If determining that the first URI matches the second URI, the NFp performs 51603A. If determining that the first URI does not match the second URI, the NFp performs 51603B.

S1603A: The NFp returns first response information to the NFc, and the NFc receives the first response information, where the first response information indicates that the subscription request of the NFc succeeds or the NFp accepts the subscription request.

Specifically, after agreeing to the subscription request sent by the NFc, the NFp may send, to the NFc based on a preset time periodicity, a notification message related to an NF service supported by the NFp.

S1603B: The NFp returns second response information to the NFc, and the NFc receives the second response information, where the second response information indicates that the subscription request of the NFc fails or the NFp rejects the subscription request.

In the embodiment shown in FIG. 16, the NFp determines, through verification, whether the first URI in the first information of the NFc carried in the subscription request is consistent with the second URI in a transport layer certificate of the NFc, so that a case in which the NFc illegally carries illegal URIs in the subscription request to illegally obtain network information can be effectively avoided. This effectively avoids that the network information of the NF service is disclosed.

The foregoing describes the service authorization method provided in embodiments of this application with reference to FIG. 4 to FIG. 16. The following describes apparatuses provided in embodiments of this application with reference to FIG. 17, FIG. 18, and FIG. 19.

Based on a same technical concept, an embodiment of this application further provides a communication apparatus 1700. The apparatus 1700 has a function of implementing an NRF in a foregoing method example. For example, the apparatus 1700 includes a corresponding module, unit, or means for performing the steps performed by the NRF in the embodiment shown in FIG. 10. The function, unit, or means may be implemented by software, or may be implemented by hardware, or may be implemented by hardware by executing corresponding software.

Figure 17:
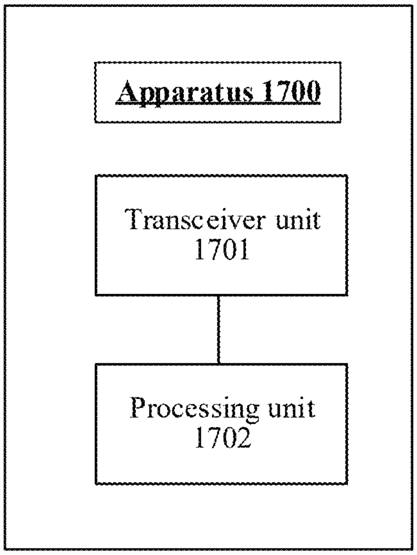
FIG. 17 is a schematic diagram of a structure of a communication apparatus according to an embodiment of this application.

For example, refer to FIG. 17. The apparatus 1700 may include:

a transceiver unit 1701, configured to receive a first token request from a first network element, where the first token request includes first information of a network function service consumer entity and an assertion of the network function service consumer entity, the assertion includes a certificate of the network function service consumer entity, and the certificate includes second information of the network function service consumer entity; and a processing unit 1702, configured to determine, through verification, whether the first information matches the second information, and when determining that the first information matches the second information, generate a token, where the transceiver unit 1701 is further configured to send the token to the first network element.

It should be understood that related content of steps in the foregoing method embodiments may be cited in function descriptions of corresponding functional modules. Details are not described herein again.

Based on a same technical concept, an embodiment of this application further provides a communication apparatus 1800. The apparatus 1800 has a function of implementing a first network element in a foregoing method example. For example, the apparatus 1800 includes a corresponding module, unit, or means for performing the steps performed by the first network element in the embodiment shown in FIG. 7. The function, unit, or means may be implemented by software, or may be implemented by hardware, or may be implemented by hardware by executing corresponding software.

Figure 18:
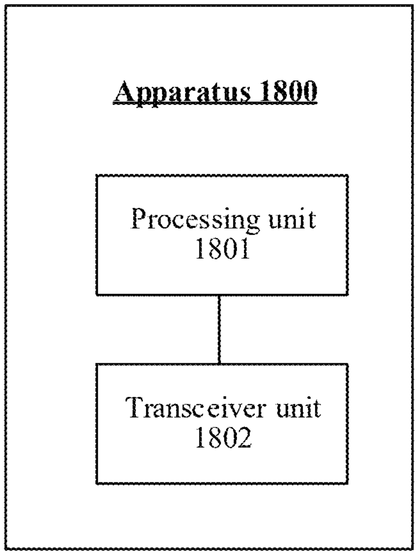
FIG. 18 is a schematic diagram of a structure of a communication apparatus according to an embodiment of this application.

For example, refer to FIG. 18. The apparatus 1800 may include:

a processing unit 1801, configured to generate a first token request, where the first token request includes first information of a network function service consumer entity and an assertion of the network function service consumer entity, the assertion includes a certificate of the network function service consumer entity, and the certificate includes second information of the network function service consumer entity; and a transceiver unit 1802, configured to send the first token request to a network repository function network element, and receive a token from the network repository function network element.

It should be understood that related content of steps in the foregoing method embodiments may be cited in function descriptions of corresponding functional modules. Details are not described herein again.

Based on a same technical concept, an embodiment of this application further provides a communication apparatus 1900. The apparatus 1900 has a function of implementing an NFp in a foregoing method example. For example, the apparatus 1900 includes a corresponding module, unit, or means for performing the steps performed by the NFp in the embodiment shown in FIG. 7. The function, unit, or means may be implemented by software, or may be implemented by hardware, or may be implemented by hardware by executing corresponding software.

Figure 19:
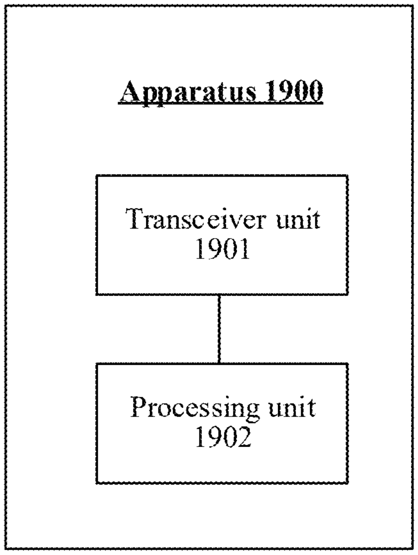
FIG. 19 is a schematic diagram of a structure of a communication apparatus according to an embodiment of this application.

For example, refer to FIG. 19. The apparatus 1900 may include:

a transceiver unit 1901, configured to receive a first service request from a first network element, where the first service request includes a token and an assertion, the token includes a first network function instance identifier, and the assertion includes a second network function instance identifier; and a processing unit 1902, configured to determine, through verification, whether the first network function instance identifier matches the second network function instance identifier, and when determining that the first network function instance identifier matches the second network function instance identifier, provide a service for a network function service consumer entity.

It should be understood that related content of steps in foregoing method embodiments may be cited in function descriptions of corresponding functional modules. Details are not described herein again.

Based on a same technical concept, an embodiment of this application further provides an electronic device 2000, configured to implement methods in embodiments shown in FIG. 4 to FIG. 16.

Figure 20:
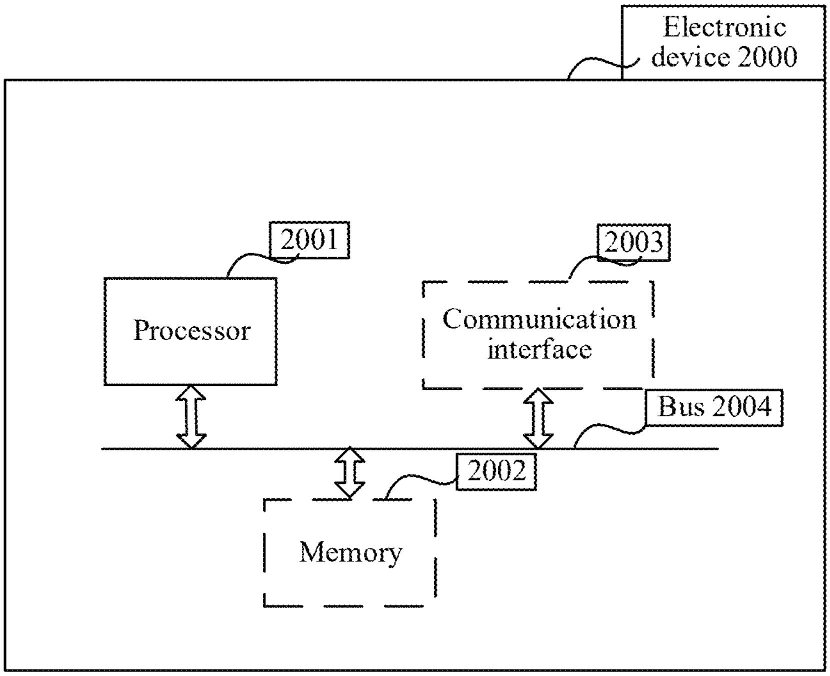
FIG. 20 is a schematic diagram of a structure of an electronic device according to an embodiment of this application.

As shown in FIG. 20, the electronic device 2000 may include a processor 2001, configured to execute a program or instructions stored in the memory 2002. When the program or the instructions stored in the memory 2002 are executed, the processor is configured to perform the method in embodiments shown in FIG. 4 to FIG. 16.

Optionally, the electronic device 2000 may further include a communication interface 2003. In FIG. 20, the communication interface 2003 is represented by a dashed line, and is optional for the electronic device 2000.

A quantity of processors 2001, memories 2002, and communication interfaces 2003 does not constitute a limitation on this embodiment of this application, and during specific implementation, may be randomly configured based on a service requirement.

Optionally, the memory 2002 is located outside the electronic device 2000.

Optionally, the electronic device 2000 includes the memory 2002, the memory 2002 is connected to the at least one processor 2001, and the memory 2002 stores instructions that can be executed by the at least one processor 2001. In FIG. 20, the memory 2002 is represented by a dashed line, and is optional for the electronic device 2000.

The processor 2001 and the memory 2002 may be coupled through an interface circuit, or may be integrated together. This is not limited herein.

A specific connection medium between the processor 2001, the memory 2002, and the communication interface 2003 is not limited in this embodiment of this application. In this embodiment of this application, the processor 2001, the memory 2002, and the communication interface 2003 are connected through a bus 2004 in FIG. 20. The bus is represented by using a bold line in FIG. 20. A connection manner between other components is merely an example for description, and is not limited thereto. The bus may be classified into an address bus, a data bus, a control bus, and the like. For ease of representation, only one thick line is for representing the bus in FIG. 20, but this does not mean that there is only one bus or only one type of bus.

It should be understood that the processor mentioned in embodiments of this application may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

For example, the processor may be a central processing unit (CPU), or may be another general-purpose processor, a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be noted that the memory described in this specification aims to include but is not limited to these memories and any memory of another proper type.

Based on a same technical concept, an embodiment of this application further provides a computer-readable storage medium, including a program or instructions. When the program or the instructions are run on a computer, a method performed by an NRF, a method performed by a first network element, or a method performed by an NFp in a foregoing method example is performed.

Based on a same technical concept, an embodiment of this application further provides a chip. The chip is coupled to a memory, and is configured to read and execute program instructions stored in the memory, so that a method performed by an NRF, a method performed by a first network element, or a method performed by an NFp in a foregoing method example is performed.

Based on a same technical concept, an embodiment of this application further provides computer program instructions. When the computer program instructions are run on a computer, a method performed by an NRF, a method performed by a first network element, or a method performed by an NFp in a foregoing method example is performed.

The foregoing embodiments may be combined with each other to achieve different technical effects.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It will be appreciated that a person skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. A processing method, wherein the method comprises:

receiving, by a network repository function network element, a token request from a network function service consumer entity, wherein the token request carries a first network function type of the network function service consumer entity;

obtaining, by the network repository function network element, a certificate of the network function service consumer entity, wherein the certificate comprises a second network function type;

determining, by the network repository function network element, whether the first network function type of the network function service consumer entity matches the second network function type comprised in the certificate; and in response to determining that the first network function type of the network function service consumer entity matches the second network function type comprised in the certificate, sending, by the network repository function network element, a token to the network function service consumer entity.

2. The method according to claim 1, wherein the method further comprises:

in response to determining that the first network function type of the network function service consumer entity does not match the second network function type comprised in the certificate, sending, by the network repository function network element, a failure response to the network function service consumer entity.

3. The method according to claim 1, wherein the method further comprises:

receiving, by a network function service provider entity, a service request from the network function service consumer entity, wherein the service request comprises the token and an assertion, the token comprises a first network function (NF) instance identifier (ID), and the assertion comprises a second NF instance ID;

determining, by the network function service provider entity, whether the first NF instance ID matches the second NF instance ID; and in response to determining that the first NF instance ID matches the second NF instance ID, sending, by the network function service provider entity, a service response to the network function service consumer entity.

4. The method according to claim 3, wherein the method further comprises:

in response to determining that the first NF instance ID does not match the second NF instance ID, sending, by the network function service provider entity, a failure response to the network function service consumer entity.

5. The method according to claim 1, wherein the method further comprises:

in response to determining that the first network function type of the network function service consumer entity matches the second network function type comprised in the certificate, generating the token.

6. The method according to claim 1, wherein the second network function type is carried in an extension field of the certificate.

7. A communication apparatus, comprising:

at least one processor; and one or more memories coupled to the at least one processor and storing programming instructions;

wherein the at least one processor is configured to execute the programming instructions to facilitate the following being performed by the communication apparatus:

receiving a token request from a network function service consumer entity, wherein the token request carries a first network function type of the network function service consumer entity;

obtaining a certificate of the network function service consumer entity, wherein the certificate comprises a second network function type;

determining whether the first network function type of the network function service consumer entity matches the second network function type comprised in the certificate; and in response to determining that the first network function type of the network function service consumer entity matches the second network function type comprised in the certificate, sending a token to the network function service consumer entity.

8. The apparatus according to claim 7, wherein the at least one processor is further configured to execute the programming instructions to facilitate the following being performed by the communication apparatus:

in response to determining that the first network function type of the network function service consumer entity does not match the second network function type comprised in the certificate, sending a failure response to the network function service consumer entity.

9. The apparatus according to claim 7, wherein the at least one processor is further configured to execute the programming instructions to facilitate the following being performed by the communication apparatus:

in response to determining that the first network function type of the network function service consumer entity matches the second network function type comprised in the certificate, generating the token.

10. The apparatus according to claim 7, wherein the at least one processor is further configured to execute the programming instructions to facilitate the following being performed by the communication apparatus:

receiving, by a network function service provider entity, a service request from the network function service consumer entity, wherein the service request comprises the token and an assertion, the token comprises a first network function (NF) instance identifier (ID), and the assertion comprises a second NF instance ID; and determining, by the network function service provider entity, whether the first NF instance ID matches the second NF instance ID;

in response to determining that the first NF instance ID matches the second NF instance ID, sending, by the network function service provider entity, a service response to the network function service consumer entity.

11. The apparatus according to claim 10, wherein the at least one processor is further configured to execute the programming instructions to facilitate the following being performed by the communication apparatus:

in response to determining that the first NF instance ID does not match the second NF instance ID, sending, by the network function service provider entity, a failure response to the network function service consumer entity.

12. The apparatus according to claim 7, wherein the second network function type is carried in an extension field of the certificate.

13. A communication system, comprising: a first communication apparatus comprising at least one processor and one or more memories coupled to the at least one processor and storing programming instructions, which when executed by the at least one processor, cause the first communication apparatus to receive a token request from a network function service consumer entity, wherein the token request carries a first network function type of the network function service consumer entity;

obtain a certificate of the network function service consumer entity, wherein the certificate comprises a second network function type;

determine whether the first network function type of the network function service consumer entity matches the second network function type comprised in the certificate; and in response to determining that the first network function type of the network function service consumer entity matches the second network function type comprised in the certificate, send a token to the network function service consumer entity; and a second communication apparatus comprising at least one processor and one or more memories coupled to the at least one processor and storing programming instructions, that when executed by the at least one processor, cause the second communication apparatus:

receive a service request from the network function service consumer entity, wherein the service request comprises the token and an assertion, the token comprises a first network function (NF) instance identifier (ID), and the assertion comprises a second NF instance ID;

determine whether the first NF instance ID matches the second NF instance ID; and in response to determining that the first NF instance ID matches the second NF instance ID, send a service response to the network function service consumer entity.

14. The system according to claim 13, wherein the first communication apparatus is further configured to:

in response to determining that the first network function type of the network function service consumer entity does not match the second network function type comprised in the certificate, send a failure response to the network function service consumer entity.

15. The system according to claim 13, wherein the second communication apparatus is further configured to:

in response to determining that the first NF instance ID does not match the second NF instance ID, send a failure response to the network function service consumer entity.

16. The system according to claim 13, wherein the first communication apparatus is further configured to: generate the token.

17. The system according to claim 13, wherein the second network function type is carried in an extension field of the certificate.

18. A non-transitory computer-readable medium having processor-executable instructions stored thereon, wherein the processor-executable instructions, when executed, facilitate performance of the following:

receiving, by a network repository function network element, a token request from a network function service consumer entity, wherein the token request carries a first network function type of the network function service consumer entity;

obtaining, by the network repository function network element, a certificate of the network function service consumer entity, wherein the certificate comprises a second network function type;

determining, by the network repository function network element, whether the first network function type of the network function service consumer entity matches the second network function type comprised in the certificate; and in response to determining that the first network function type of the network function service consumer entity matches the second network function type comprised in the certificate, sending, by the network repository function network element, a token to the network function service consumer entity.

19. The non-transitory computer-readable medium according to claim 18, wherein the processor-executable instructions, when executed, further facilitate performance of the following:

receiving, by a network function service provider entity, a service request from the network function service consumer entity, wherein the service request comprises the token and an assertion, the token comprises a first network function (NF) instance identifier (ID), and the assertion comprises a second NF instance ID;

determining, by the network function service provider entity, whether the first NF instance ID matches the second NF instance ID; and in response to determining that the first NF instance ID matches the second NF instance ID, sending, by the network function service provider entity, a service response to the network function service consumer entity.

20. The non-transitory computer-readable medium according to claim 18, wherein the processor-executable instructions, when executed, further facilitate performance of the following:

in response to determining that the first network function type of the network function service consumer entity matches the second network function type comprised in the certificate, generating the token.

* * * * *